United States Patent
Tizhoosh et al.

(10) Patent No.: US 11,610,395 B2
(45) Date of Patent: Mar. 21, 2023

(54) SYSTEMS AND METHODS FOR GENERATING ENCODED REPRESENTATIONS FOR MULTIPLE MAGNIFICATIONS OF IMAGE DATA

(71) Applicant: Huron Techonologies International Inc., St. Jacobs (CA)

(72) Inventors: Hamid Reza Tizhoosh, St. Jacobs (CA); Savvas Damaskinos, St. Jacobs (CA); Arthur Edward Dixon, St. Jacobs (CA)

(73) Assignee: Huron Technologies International Inc., St. Jacobs (CA)

( * ) Notice: Subject to any disclaimer, the term of this patent is extended or adjusted under 35 U.S.C. 154(b) by 0 days.

(21) Appl. No.: 17/534,693

(22) Filed: Nov. 24, 2021

(65) Prior Publication Data
US 2022/0198787 A1    Jun. 23, 2022

Related U.S. Application Data

(60) Provisional application No. 63/117,636, filed on Nov. 24, 2020.

(51) Int. Cl.
*G06K 9/00* (2022.01)
*G06V 10/82* (2022.01)
(Continued)

(52) U.S. Cl.
CPC ............ *G06V 10/82* (2022.01); *G06F 16/532* (2019.01); *G06F 16/55* (2019.01); *G06F 16/56* (2019.01);
(Continued)

(58) Field of Classification Search
CPC ......... G06T 2207/10101; G06T 7/0012; G06T 2207/30101; G06T 2207/30204;
(Continued)

(56) References Cited

U.S. PATENT DOCUMENTS

| 4,991,092 A | 2/1991 | Greensite |
| 5,136,660 A | 8/1992 | Flickner et al. |

(Continued)

FOREIGN PATENT DOCUMENTS

| EP | 1912160 A1 | 4/2008 |
| WO | 2008089129 A1 | 7/2008 |

OTHER PUBLICATIONS

Mahmood, Artificial Intelligence-Based Mitosis Detection in Breast Cancer Histopathology Images Using Faster R-CNN and Deep CNNs, Mar. 2020, MDPI (Year: 2020).*
(Continued)

*Primary Examiner* — Alex Kok S Liew
(74) *Attorney, Agent, or Firm* — Bereskin & Parr LLP/S.E.N.C.R.L., S.r.l.

(57) ABSTRACT

Computer-implemented methods and systems are provided for generating encoded representations for multiple magnifications of one or more query images. An example method for involves operating a processor to obtain a query image and identify a set of anchor points within the query image. The processor is operable to generate a plurality of sub-images for a plurality of magnification levels for each anchor point. Each sub-image includes the anchor point and corresponds to a magnification level of the plurality of magnification levels. The processor is operable to, for each magnification level, apply an artificial neural network model to a group of sub-images having that magnification level to extract a feature vector representative of image characteristics of the query image at that magnification level; and to generate an encoded representation for multiple magnifications of the query image based on the feature vectors extracted for the plurality of magnification levels.

38 Claims, 16 Drawing Sheets

(51) Int. Cl.
  *G06T 7/10* (2017.01)
  *G06F 16/55* (2019.01)
  *G06F 16/532* (2019.01)
  *G06F 16/56* (2019.01)
  *G06V 10/762* (2022.01)
  *G06V 10/77* (2022.01)
  *G06V 10/44* (2022.01)
  *G06V 10/764* (2022.01)
  *G06T 9/00* (2006.01)

(52) U.S. Cl.
  CPC ............ *G06T 7/10* (2017.01); *G06T 9/002* (2013.01); *G06V 10/44* (2022.01); *G06V 10/762* (2022.01); *G06V 10/764* (2022.01); *G06V 10/77* (2022.01); *G06T 2207/20021* (2013.01)

(58) Field of Classification Search
  CPC ......... G06T 7/11; G06T 7/12; G06T 2200/24; G06T 2207/20028; G06T 2207/20116; G06T 2207/20161; C12N 15/1065; G01N 2021/6439; G01N 21/6458; G01N 2800/362; G01N 33/6893; G01N 21/6486; G01N 33/4833; G01N 33/5061; G01N 33/5082; G01N 2800/7095
  See application file for complete search history.

(56) References Cited

U.S. PATENT DOCUMENTS

| | | |
|---|---|---|
| 5,243,655 A | 9/1993 | Wang |
| 5,270,926 A | 12/1993 | Tam |
| 5,288,977 A | 2/1994 | Amendolia et al. |
| 5,463,666 A | 10/1995 | Eberhard et al. |
| 5,524,068 A | 6/1996 | Kacandes et al. |
| 5,592,374 A | 1/1997 | Fellegara et al. |
| 5,969,325 A | 10/1999 | Hecht et al. |
| 6,424,737 B1 | 7/2002 | Rising |
| 6,714,665 B1 | 3/2004 | Hanna et al. |
| 7,239,750 B2 | 7/2007 | Rising |
| 7,949,186 B2 | 5/2011 | Grauman et al. |
| 8,086,587 B2 | 12/2011 | Obana et al. |
| 8,117,071 B1 | 2/2012 | Fitch et al. |
| 8,494,268 B2 | 7/2013 | Soederberg et al. |
| 8,872,814 B1 | 10/2014 | Agaian et al. |
| 8,879,120 B2 | 11/2014 | Thrasher et al. |
| 9,081,822 B2 | 7/2015 | Xu et al. |
| 9,122,955 B2 | 9/2015 | Greenspan et al. |
| 9,316,743 B2 | 4/2016 | Rousso et al. |
| 9,342,893 B1 | 5/2016 | Wiley |
| 9,361,698 B1 | 6/2016 | Song et al. |
| 9,495,571 B1 | 11/2016 | Xiao et al. |
| 9,535,928 B2 | 1/2017 | Xu et al. |
| 9,710,491 B2 | 7/2017 | Ke et al. |
| 9,710,695 B2 | 7/2017 | Xu et al. |
| 2004/0133927 A1 | 7/2004 | Sternberg et al. |
| 2004/0240737 A1 | 12/2004 | Lim et al. |
| 2005/0001033 A1 | 1/2005 | Cheong et al. |
| 2006/0204042 A1 | 9/2006 | Hammoud et al. |
| 2006/0257010 A1 | 11/2006 | George et al. |
| 2007/0181691 A1 | 8/2007 | Chang |
| 2007/0196007 A1 | 8/2007 | Chen et al. |
| 2008/0078836 A1 | 4/2008 | Tomita |
| 2008/0260200 A1 | 10/2008 | Suzaki |
| 2009/0001167 A1 | 1/2009 | Usuba |
| 2009/0060303 A1 | 3/2009 | Douglass et al. |
| 2009/0121027 A1 | 5/2009 | Nadabar |
| 2009/0322489 A1 | 12/2009 | Jones et al. |
| 2010/0008589 A1 | 1/2010 | Bober et al. |
| 2010/0014780 A1 | 1/2010 | Kalayeh |
| 2010/0046753 A1 | 2/2010 | Inami et al. |
| 2010/0067799 A1 | 3/2010 | Liu et al. |
| 2010/0104148 A1 | 4/2010 | Bovik et al. |
| 2010/0187311 A1 | 7/2010 | van der Merwe et al. |
| 2010/0188580 A1 | 7/2010 | Paschalakis et al. |
| 2011/0043864 A1 | 2/2011 | Tian et al. |
| 2011/0075931 A1 | 3/2011 | Chiou et al. |
| 2011/0106782 A1 | 5/2011 | Ke et al. |
| 2011/0128566 A1 | 6/2011 | Eum et al. |
| 2011/0158533 A1 | 6/2011 | Gutelzon et al. |
| 2011/0317004 A1 | 12/2011 | Tao |
| 2012/0043377 A1 | 2/2012 | Haar et al. |
| 2012/0173347 A1 | 7/2012 | Neves et al. |
| 2013/0001290 A1 | 1/2013 | Trajkovic et al. |
| 2013/0022231 A1 | 1/2013 | Nepomniachtchi et al. |
| 2013/0048731 A1 | 2/2013 | Flickner et al. |
| 2013/0098983 A1 | 4/2013 | Neff |
| 2013/0343654 A1 | 12/2013 | Demoulin et al. |
| 2014/0044361 A1 | 2/2014 | Lee |
| 2014/0056402 A1 | 2/2014 | Kikuchi et al. |
| 2014/0142979 A1 | 5/2014 | Mitsunaga |
| 2014/0241585 A1 | 8/2014 | Zafiroglu et al. |
| 2014/0263674 A1 | 9/2014 | Cerveny |
| 2014/0307934 A1 | 10/2014 | Batenburg et al. |
| 2015/0363660 A1 | 12/2015 | Vidal et al. |
| 2016/0203379 A1 | 7/2016 | Hakim et al. |
| 2016/0239972 A1 | 8/2016 | Zhu et al. |
| 2017/0091281 A1 | 3/2017 | Tizhoosh |
| 2017/0091580 A1 | 3/2017 | Song et al. |
| 2018/0360427 A1 | 12/2018 | Nakano et al. |
| 2019/0259492 A1 | 8/2019 | Reicher et al. |
| 2019/0303706 A1 | 10/2019 | Tizhoosh |
| 2020/0176102 A1 | 6/2020 | Tizhoosh |

OTHER PUBLICATIONS

Araujo, Classification of breast cancer histology images using Convolutional Neural Networks, Jun. 2017, PLOS one (Year: 2017).*

Hoang, et al., "Invariant pattern recognition using the RFM descriptor," Pattern Recognition, vol. 45, pp. 271-284, 2012.

Jadhav, et al., "Feature extraction using radon and wavelet transforms with application to face recognition," Neurocomputing, vol. 72, pp. 1951-1959, 2009.

Zhao, et al., "Retrieval of ocean wavelength and wave direction from sar image based on radon transform," in IEEE International Geoscience and Remote Sensing Symposium, 2013, pp. 1513-1516, Jul. 21-26, 2013, Melbourne, Victoria, Australia.

Chen, et al., "Invariant Description and Retrieval of Planar Shapes Using Radon Composite Features", IEEE Transactions on Signal Processing, Oct. 2008, vol. 56 (10), pp. 4762-4771.

Tabbone, et al., "Histogram of radon transform. a useful descriptor for shape retrieval," in 19th International Conference on Pattern Recognition (ICPR 2008), Dec. 8-11, 2008, Tampa, Florida, USA. IEEE Computer Society 2008, pp. 1-4.

Daras, et al., "Efficient 3-D Model Search and Retrieval Using Generalized 3-D Radon Transforms", Multimedia, IEEE Transactions on, Feb. 2006, vol. 8 (1), pp. 101-114.

Kadyrov, et al., "The trace transform and its applications," IEEE Trans. on Pattern Analysis and Machine Intell. vol. 23, No. 8, pp. 811-828, 2001.

Heutte, et al., "A structural/statistical feature based vector for handwritten character recognition," Pattern Recognition Letter, vol. 19, No. 7, pp. 629-641, 1998.

Jafari-Khouzani et al., "Radon transform orientation estimation for rotation invariant texture analysis," IEEE Transactions on Pattern Analysis and Machine Intelligence, vol. 27, No. 6, pp. 1004-1008, 2005.

Tizhoosh, "Barcode Annotations for Medical Image Retrieval: A preliminary investigation", in IEEE International Conference on Image Processing, Sep. 2015, pp. 818-822.

Tizhoosh, et al., "MinMax Radon Barcodes for Medical Image Retrieval," Springer International Publishing, 2016, pp. 617-627.

Babaie et al., "Classification and retrieval of digital pathology scans: A new dataset," in Workshop for Computer Vision for Microscopy Image Analysis (CVMI 2017), CVPR, Jul. 21-26, 2017, Honolulu, Hawaii, USA (9 pages).

(56) References Cited

OTHER PUBLICATIONS

Babaie et al., "Local Radon Descriptors for Image Search," 7th Int. Conf. on Image Processing Theory, Tools and Applications (IPTA 2017), Nov. 28-Dec. 1, 2017, Montreal, Quebec, CA (5 pages).
Rajendran, et al., "Radon Transform based Local Tomography Algorithm for 3D Reconstruction, "Int'l Journal of Biology and Biomedical Eng., Issue 1, vol. 6, pp. 1-8, 2012.
Babaie, et al., "Retrieving Similar X-Ray Images from Big Image Data using Radon Barcodes with Single Projections," Proc. 6th Int'l Conf. on Pattern Recognition Applications and Methods (ICPRAM) 2017), pp. 557-566, Feb. 24-26, 2017, Porto, Portugal.
Daugman, "How iris recognition works", IEEE Transactions on Circuits and Systems for Video Technology, Jan. 2004, vol. 14 (1), pp. 21-30.
Leutenegger et al., "Brisk: Binary Robust Invariant Scalable Key Points", in Proceedings of the 2011 IEEE International Conference on Computer Vision, Nov. 6-13, 2011, pp. 2548-2555.
Muja et al., "Fast Matching of Binary Features," in Proceedings of the 2012 Ninth Conference on Computer and Robot Vision, May 28-30, 2012, CRV '12, pp. 404-410.
Nacereddine et al., "Shape-Based Image Retrieval Using a New Descriptor Based on the Radon and Wavelet Transforms", in International Conference on Pattern Recognition, Aug. 23-26, 2010, pp. 1197-2000.
Ojala et al., "MultiResolution Gray-Scale and Rotation invariant Texture Classification with Local Binary Patterns," IEEE Transactions on Pattern Analysis & Machine Intelligence, Aug. 7, 2002, vol. 24 (7), pp. 971-987.
Seo et al., "A robust image fingerprinting using the Radon transform", Department of EECS, KAIST, 373-1 Guseong Dong, Yuseong Gu, Daejeon 305-701, South Korea Philips Research Eindhoven, Prof. Holstlaan 4, Eindhoven 5656AA, The Netherlands; May 6, 2003 (15 pages).
Sundermeyer et al., "LSTM Neural Networks for Language Modeling", 2012, Human Language Technology and Pattern Recognition, Computer Science Department, RWTH Aschen University, Aachen, Germany (4 pages).
Kieffer, et al,. (Nov. 2017). Convolutional neural networks for histopathology image classification: training vs. using pre-trained networks. In 2017 Seventh International Conference on Image Processing Theory, Tools and Applications (IPTA) (pp. 1-6). IEEE.
Hunt et al., "A Microdissection and Molecular Genotyping Assay to Confirm the Identity of Tissue Floaters in Paraffin-Embedded Tissue Blocks", Molecular Identification of Tissue Floaters, Arch Pathol Lab Med, vol. 127, Feb. 2003, pp. 213-217.
Lowe, "Object recognition from local scale-invariant features." Computer vision, 1999. The proceedings of the seventh IEEE international conference on. vol. 2. Ieee, 1999 (8 pages).
Kohonen, "The self-organizing map." Proceedings of the IEEE 78.9 (1990): 1464-1480.
Hartigan, et al., "Algorithm AS 136: A k-means clustering algorithm." Journal of the Royal Statistical Society. Series C (Applied Statistics) 28.1 (1979): 100-108.
Vinyals, et al., (2017). Show and tell: Lessons learned from the 2015 mscoco image captioning challenge. IEEE transactions on pattern analysis and machine intelligence, 39(4), 652-663.
Bayramoglu et al., (Dec. 2016). Deep learning for magnification independent breast cancer histopathology image classification. In 2016 23rd International conference on pattern recognition (ICPR) (pp. 2440-2445). IEEE.
Liu et al., (2017). Detecting cancer metastases on gigapixel pathology images. arXiv preprint arXiv:1703.02442 (13 pages).
Sellaro et al., (2013). Relationship between magnification and resolution in digital pathology systems. Journal of pathology informatics, 4 (5 pages).
Song et al., (2015). Accurate segmentation of cervical cytoplasm and nuclei based on multiscale convolutional network and graph partitioning. IEEE Transactions on Biomedical Engineering, 62(10), 2421-2433.
Romo et al., (Mar. 2014). A discriminant multi-scale histopathology descriptor using dictionary learning. In Medical Imaging 2014: Digital Pathology (vol. 9041, p. 90410Q). International Society for Optics and Photonics (7 pages).
Doyle et al., (Oct. 2006). A boosting cascade for automated detection of prostate cancer from digitized histology. In International conference on medical image computing and computer-assisted intervention (pp. 504-511). Springer, Berlin, Heidelberg.
Tizhoosh et al., "Artificial intelligence and digital pathology: Challenges and opportunities." Journal of pathology informatics 9 (2018) (16 pages).
Kumar, et al. "A comparative study of cnn, bovw and lbp for classification of histopathological images." 2017 IEEE Symposium Series on Computational Intelligence (SSCI). IEEE, 2017 (8 pages).
Kalra, et al. "Yottixel—An Image Search Engine for Large Archives of Histopathology Whole Slide Images." arXiv preprint arXiv:1911.08748 (2019) (28 pages).
Babaie et al., "Deep Features for Tissue-Fold Detection in Histopathology Images." arXiv preprint arXiv:1903.07011 (2019) (9 pages).
Chenni et al., "Patch Clustering for Representation of Histopathology Images." arXiv preprint arXiv:1903.07013 (2019) (9 pages).
Kalra et al. "Pan-Cancer Diagnostic Consensus Through Searching Archival Histopathology Images Using Artificial Intelligence." arXiv preprint arXiv:1911.08736 (2019) (21 pages).
Barker Jocelyn et al: "Automated classification of brain tumor type in whole-slide digital pathology images using local representative tiles", Medical Image Analysis, vol. 30, Dec. 29, 2015 (Dec. 29, 2015), pp. 60-71.
ISA/CA, "International Search Report and Written Opinion of the ISA", dated Mar. 3, 2022, issued in PCT International Application No. PCT/CA2021/051670 (8 pages).
Hiroki et al., "Adaptive Weighting Multi-Field-Of-View CNN for Semantic Segmentation in Pathology". 2019 IEEE/CVF Conference on Computer Vision and Pattern Recognition (CVPR), Jun. 15, 2019 (Jun. 15, 2019),pp. 12589-12598, ISSN 2575-7075 [online] [retrieved on Mar. 1, 2022 (Mar. 1, 2022)]. Retrieved from the Internet: <https://ieeexplore.ieee.org/stamp/stamp.jsp?tp=&arnumber=8953284>.
Ho et al., "Deep Multi-Magnification Networks for Multi-Class Breast Cancer Image Segmentation". arXiv:1910.13042v1, Apr. 1, 2021 (Apr. 1, 2021),pp. 1-12, [online] [retrieved on Mar. 1, 2022 (Mar. 1, 2022)]. Retrieved from the Internet: <https://arxiv.org/pdf/1910.13042v1.pdf.

\* cited by examiner

SYSTEMS AND METHODS FOR GENERATING ENCODED REPRESENTATIONS FOR MULTIPLE MAGNIFICATIONS OF IMAGE DATA

CROSS-REFERENCE TO RELATED PATENT APPLICATIONS

This application claims priority from U.S. Provisional Patent Application No. 63/117,636, filed Nov. 24, 2020. The entire contents of U.S. Provisional Patent Application No. 63/117,636 is herein incorporated by reference for all purposes.

FIELD

The described embodiments relate to systems and methods of managing image data and in particular, systems and methods of generating encoded representations of image data.

BACKGROUND

Digital images and videos are increasingly common forms of media. As more digital content is generated and becomes available, the usefulness of that digital content largely depends on its management.

Some existing practices involve associating the digital content with searchable descriptors. Although some of these descriptors may be automatically generated, these descriptors are typically generated based on features and/or qualities identified from human observations and judgement. In addition to the amount of time required for a human to observe and generate descriptive descriptors for the digital content, the descriptors may not be universal or adaptable between different systems. Also, existing descriptors can be limited by the extent in which the digital content can be processed.

SUMMARY

The various embodiments described herein generally relate to methods (and associated systems configured to implement the methods) of generating encoded representations for multiple magnifications of one or more query images.

An example method can involve operating a processor to, for each query image, obtain the query image having an initial magnification level; identify a set of anchor points within the query image; and generate a plurality of sub-images for a plurality of magnification levels for each anchor point of the set of anchor points. Each sub-image can include the anchor point and correspond to a magnification level of the plurality of magnification levels. The method can also involve operating the processor to apply an artificial neural network model to a group of sub-images for each magnification level of the plurality of magnification levels to extract a feature vector representative of image characteristics of the query image at that magnification level. The method can also involve operating the processor to generate an encoded representation for multiple magnifications of the query image based on the feature vectors extracted for the plurality of magnification levels.

In some embodiments, each sub-image of the plurality of sub-images for the plurality of magnification levels can consist of an equal number of pixels as other sub-images of the plurality of sub-images.

In some embodiments, each sub-image of the plurality of sub-images for the plurality of magnification levels can include same dimensions as other sub-images of the plurality of sub-images, the dimensions being characterized by pixels.

In some embodiments, each sub-image of the plurality of sub-images for an anchor point can correspond to a portion of the query image having a different area size than another sub-image for the anchor point.

In some embodiments, at least a portion of each sub-image of the plurality of sub-images for an anchor point can correspond to the same portion of the query image as the other sub-images of the plurality of sub-images for that anchor point.

In some embodiments, the method can involve sampling at least a portion of the query image to obtain one or more versions of at least the portion of the query image having a magnification level less than the initial magnification level.

In some embodiments, the method can involve dividing the portion of the query image into subsets of pixels; and for each subset of pixels, generating one or more representative pixels for representing the subset of pixels, the representative pixels being fewer than the subset of pixels.

In some embodiments, for each subset of pixels, the one or more representative pixels can include one representative pixel.

In some embodiments, for each subset of pixels, an intensity level of the representative pixel can include an average of intensity levels of the pixels of the subset of pixels.

In some embodiments, the average of the intensity levels of the pixels of the subset of pixels can include the mean of the intensity levels of pixels of the subset of pixels.

In some embodiments, the method can involve sampling the query image to obtain one or more versions of the query image. Each version of the query image can have a magnification level of the plurality of magnification levels. Identifying the set of anchor points within the query image can involve identifying a set of anchor points within each of the one or more versions of the query image. Generating the plurality of sub-images for the plurality of magnification levels for each anchor point of the set of anchor points can involve generating a sub-image for each anchor point of the set of anchor points from each of the one or more versions of the query images.

In some embodiments, the method involve generating a plurality of initial sub-images from the query image and sampling each initial sub-image to obtain a version of the initial sub-image. Each initial sub-image of the plurality of initial sub-images can have the initial magnification level. Each version of the sub-image can have a magnification level of the plurality of magnification levels.

In some embodiments, each initial sub-image of the plurality of initial sub-images can consists of a different number of pixels than another sub-image for the anchor point.

In some embodiments, each initial sub-image of the plurality of initial sub-images can include different dimensions than another sub-image for the anchor point, the dimensions being characterized by pixels.

In some embodiments, each initial sub-image of the plurality of initial sub-images for an anchor point can correspond to a portion of the query image having a different area size than another initial sub-image for the anchor point.

In some embodiments, the method can involve generating a plurality of concentric sub-images for the plurality of magnification.

In some embodiments, the method can involve using the anchor point as a center point of each sub-image of the plurality of sub-images for the plurality of magnification levels.

In some embodiments, the method can involve repeatedly pooling and convoluting the group of sub-images to extract and aggregate feature vectors for that magnification level, and compressing the feature vectors for that magnification level to obtain a feature vector for that magnification level.

In some embodiments, sub-images having different magnification levels can be repeatedly pooled and convoluted in parallel.

In some embodiments, sub-images having different magnification levels can be repeatedly pooled and convoluted in sequence.

In some embodiments, the method can involve concatenating the feature vectors extracted for each magnification level together.

In some embodiments, the method can involve classifying the feature vector for that magnification level to obtain a classification of image characteristics of the query image at that magnification level.

In some embodiments, the method can involve applying one or more fully connected neural network layers to the feature vector obtained for that magnification level.

In some embodiments, the method can involve concatenating the feature vector for each magnification of the plurality of magnifications together.

In some embodiments, the method can involve, for each magnification level of the plurality of magnification levels, reducing a number of feature vectors for that magnification level.

In some embodiments, the method can involve identifying a median feature vector to represent a plurality of feature vectors.

In some embodiments, the method can involve clustering a plurality of feature vectors into a plurality of clusters and selecting a subset of feature vectors from each cluster of the plurality of clusters to represent the plurality of feature vectors.

In some embodiments, the method can involve combining feature vectors for a magnification level to obtain a feature vector for a magnification.

In some embodiments, the method can involve using at least one of principal component analysis, autoencoding, or evolutionary optimization.

In some embodiments, the method can involve generating a set of preliminary sub-images and, for each preliminary sub-image of the set of preliminary sub-images, identifying an anchor point from the preliminary sub-image to provide the set of anchor points. A relationship between each anchor point and a respective sub-image can be same.

In some embodiments, the plurality of magnification levels can include a subset of magnification levels selected from: 5×, 10×, 20×, 40×, 75×, 85×, and 100×.

In some embodiments, the plurality of magnification levels can include an initial magnification level, a second magnification level that is a half of the initial magnification level, and a third magnification level that is a quarter of the initial magnification level.

In some embodiments, each sub-image can have a square shape.

In some embodiments, the method can involve retrieving the query image stored in a pyramidal format.

In some embodiments, the method can involve operating the processor to obtain the one or more query images from an imaging device.

In some embodiments, the one or more images can include one or more medical images.

In another broad aspect, a system for generating encoded representations for multiple magnifications of one or more query images is disclosed herein. The system can include a communication component and a processor in communication with the communication component. The communication component can provide access to the one or more images via a network. The processor can be operable to, for each query image, obtain the query image having an initial magnification level; identify a set of anchor points within the query image; and generate a plurality of sub-images for a plurality of magnification levels for each anchor point of the set of anchor points. Each sub-image can include the anchor point and correspond to a magnification level of the plurality of magnification levels. The processor can also be operable to apply an artificial neural network model to a group of sub-images for each magnification level of the plurality of magnification levels to extract a feature vector representative of image characteristics of the query image at that magnification level and generate an encoded representation for multiple magnifications of the query image based on the feature vectors extracted for the plurality of magnification levels.

In some embodiments, each sub-image of the plurality of sub-images for the plurality of magnification levels can consist of an equal number of pixels as other sub-images of the plurality of sub-images.

In some embodiments, each sub-image of the plurality of sub-images for the plurality of magnification levels can include same dimensions as other sub-images of the plurality of sub-images, the dimensions being characterized by pixels.

In some embodiments, each sub-image of the plurality of sub-images for an anchor point can correspond to a portion of the query image having a different area size than another sub-image for the anchor point.

In some embodiments, at least a portion of each sub-image of the plurality of sub-images for an anchor point can correspond to the same portion of the query image as the other sub-images of the plurality of sub-images for that anchor point.

In some embodiments, the processor can be operable to sample at least a portion of the query image to obtain one or more versions of at least the portion of the query image having a magnification level less than the initial magnification level.

In some embodiments, the processor can be operable to divide the portion of the query image into subsets of pixels; and for each subset of pixels, generate one or more representative pixels for representing the subset of pixels. The representative pixels can be fewer than the subset of pixels.

In some embodiments, for each subset of pixels, the one or more representative pixels can include one representative pixel.

In some embodiments, for each subset of pixels, an intensity level of the representative pixel can include an average of intensity levels of the pixels of the subset of pixels.

In some embodiments, the average of the intensity levels of the pixels of the subset of pixels can include the mean of the intensity levels of pixels of the subset of pixels.

In some embodiments, sampling at least the portion of the query image can involve sampling the query image to obtain one or more versions of the query image. Each version of the query image can have a magnification level of the plurality of magnification levels. Identifying the set of anchor points within the query image can involve identifying a set of anchor points within each of the one or more versions of the query image. Generating a plurality of sub-images for the plurality of magnification levels for each anchor point of the set of anchor points can involve generating a sub-image for each anchor point of the set of anchor points from each of the one or more versions of the query images.

In some embodiments, generating the plurality of sub-images for the plurality of magnification levels for each anchor point of the set of anchor points can involve: generating a plurality of initial sub-images from the query image, each initial sub-image of the plurality of initial sub-images having the initial magnification level; and sampling each initial sub-image to obtain a version of the initial sub-image, each version of the sub-image having a magnification level of the plurality of magnification levels.

In some embodiments, each initial sub-image of the plurality of initial sub-images can consist of a different number of pixels than another sub-image for the anchor point.

In some embodiments, each initial sub-image of the plurality of initial sub-images can include different dimensions than another sub-image for the anchor point, the dimensions being characterized by pixels.

In some embodiments, each initial sub-image of the plurality of initial sub-images for an anchor point can correspond to a portion of the query image having a different area size than another initial sub-image for the anchor point.

In some embodiments, the processor can be operable to generate a plurality of concentric sub-images for the plurality of magnification levels.

In some embodiments, the processor can be operable to use the anchor point as a center point of each sub-image of the plurality of sub-images for the plurality of magnification levels.

In some embodiments, the processor can be operable to repeatedly pool and convolute the group of sub-images to extract and aggregate feature vectors for that magnification level, and compress the feature vectors for that magnification level to obtain a feature vector for that magnification level.

In some embodiments, sub-images having different magnification levels can be repeatedly pooled and convoluted in parallel.

In some embodiments, sub-images having different magnification levels can be repeatedly pooled and convoluted in sequence.

In some embodiments, the processor can be operable to concatenate the feature vectors extracted for each magnification level together.

In some embodiments, the processor can be operable to classify the feature vector for that magnification level to obtain a classification of image characteristics of the query image at that magnification level.

In some embodiments, the processor can be operable to apply one or more fully connected neural network layers to the feature vector obtained for that magnification level.

In some embodiments, the processor can be operable to concatenate the feature vector for each magnification of the plurality of magnifications together.

In some embodiments, the processor can be operable to, for each magnification level of the plurality of magnification levels, reduce a number of feature vectors for that magnification level.

In some embodiments, the processor can be operable to identify a median feature vector to represent a plurality of feature vectors.

In some embodiments, the processor can be operable to cluster a plurality of feature vectors into a plurality of clusters and selecting a subset of feature vectors from each cluster of the plurality of clusters to represent the plurality of feature vectors.

In some embodiments, the processor can be operable to combine feature vectors for a magnification level to obtain a feature vector for a magnification.

In some embodiments, the processor can be operable to use at least one of principal component analysis, autoencoding, or evolutionary optimization.

In some embodiments, the processor can be operable to generate a set of preliminary sub-images and for each preliminary sub-image of the set of preliminary sub-images, identify an anchor point from the preliminary sub-image to provide the set of anchor points. A relationship between each anchor point and a respective sub-image can be same.

In some embodiments, the plurality of magnification levels can include a subset of magnification levels selected from: 5×, 10×, 20×, 40×, 75×, 85×, and 100×.

In some embodiments, the plurality of magnification levels can include an initial magnification level, a second magnification level that is a half of the initial magnification level, and a third magnification level that is a quarter of the initial magnification level.

In some embodiments, each sub-image can have a square shape.

In some embodiments, the processor can be operable to retrieve the query image stored in a pyramidal format.

In some embodiments, the processor can be operable to obtain the one or more query images from an imaging device.

In some embodiments, the system can further include the imaging device.

In some embodiments, the one or more images can include one or more medical images.

In another broad aspect, a method of generating an image identifier for multiple magnifications of one or more query images is disclosed herein. The method can involve operating a processor to, for each query image, obtain the query image having an initial magnification level and generate a plurality of sub-images for a plurality of magnification levels. Each sub-image can correspond to a magnification level of the plurality of magnification levels. The method can also involve operating the processor to apply an artificial neural network model to the plurality of sub-images to extract feature vectors representative of image characteristics of the query image at the plurality of magnification levels; and generate the image identifier for multiple magnifications of the query image based on the feature vectors extracted for the plurality of magnification levels.

In some embodiments, the method can further involve locating similar images using the image identifier for multiple magnifications.

In some embodiments, using the image identifier for multiple magnifications can involve using a portion of the image identifier for multiple magnifications as an image identifier for a single magnification.

In some embodiments, locating similar images using the image identifier for multiple magnifications can involve: locating an initial set of images using a portion of the image identifier for multiple magnifications as an image identifier for a single magnification, and locating the similar images from the initial set of images using the image identifier for multiple magnifications.

In another broad aspect, a system for generating an image identifier for multiple magnifications of one or more query images is disclosed herein. The system can include a communication component and a processor in communication with the communication component. The communication component can provide access to the one or more images via a network. The processor can be operable to, for each query image, obtain the query image having an initial magnification level, and generate a plurality of sub-images for a plurality of magnification levels. Each sub-image can correspond to a magnification level of the plurality of magnification levels; The processor can also be operable to extract feature vectors representative of image characteristics of the query image at the plurality of magnification levels from the plurality of sub-images, and generate the image identifier for multiple magnifications of the query image based on the feature vectors extracted from the plurality of sub-images for the plurality of magnification levels.

In some embodiments, the processor can be further operable to locate similar images using the image identifier for multiple magnifications.

In some embodiments, the processor can be operable to use a portion of the image identifier for multiple magnifications as an image identifier for a single magnification.

In some embodiments, the processor can be operable to locate an initial set of images using a portion of the image identifier for multiple magnifications as an image identifier for a single magnification, and locate the similar images from the initial set of images using the image identifier for multiple magnifications.

An example non-transitory computer-readable medium including instructions executable on a processor can implementing any one of the methods disclosed herein.

BRIEF DESCRIPTION OF THE DRAWINGS

Several embodiments will now be described in detail with reference to the drawings, in which:

FIG. 8B is an illustration of an example generation of a sub-image from an initial sub-image of FIG. 8A;

FIG. 8C is an illustration of an example generation of a sub-image from another initial sub-image of FIG. 8A;

Figure 1:
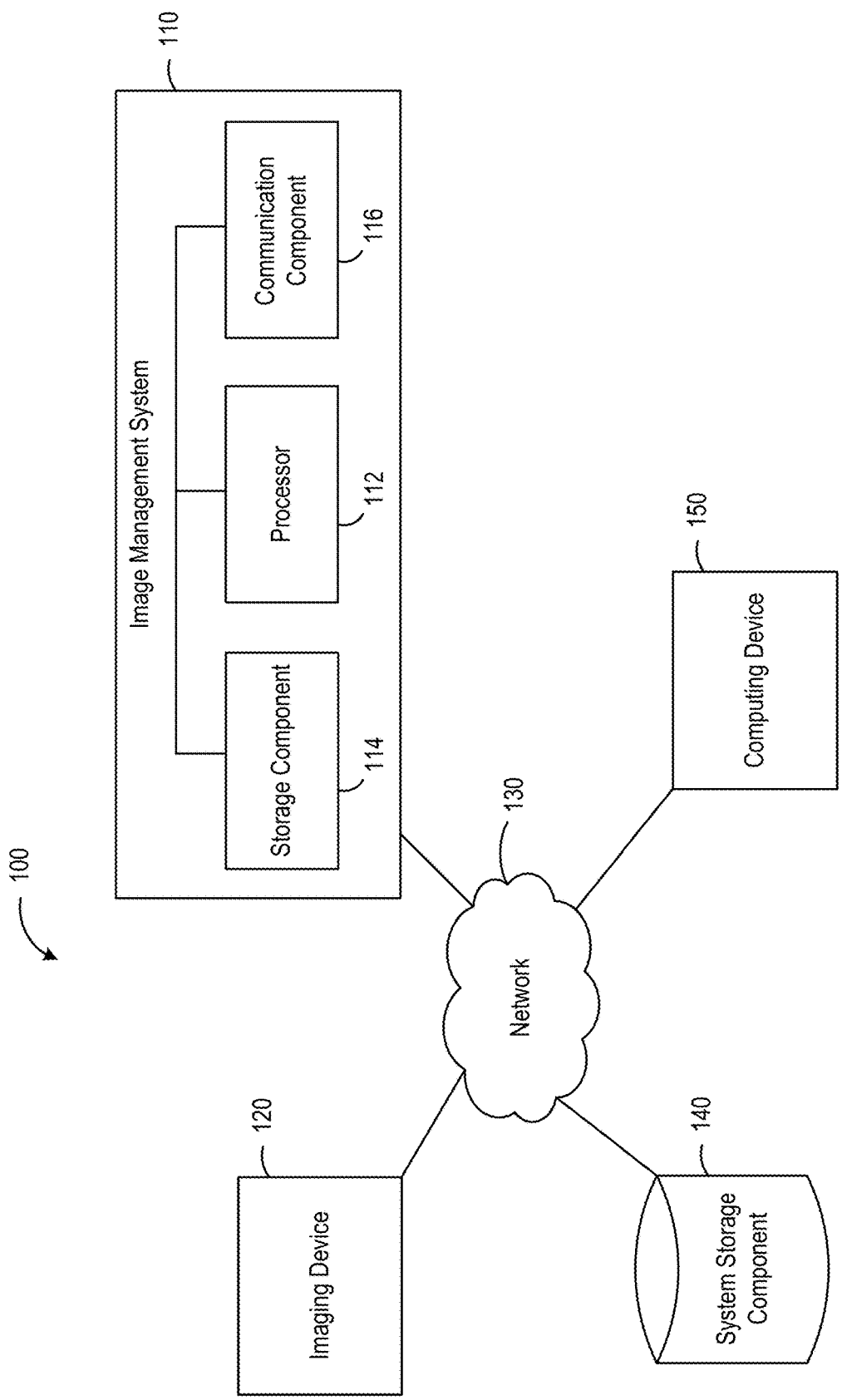
FIG. 1 is a block diagram of an image management system, in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

The various embodiments described herein generally relate to methods (and associated systems configured to implement the methods) for generating encoded representations of image data.

In the medical field, medical images of patients are regularly captured for diagnostic and/or monitoring purposes. Medical images can be captured by many various different imaging devices and undergo visual or numerical investigation for medical diagnoses and research. Modern pathology uses digital scanners to digitize microscopic images of biopsy samples on glass slides in high resolution. These images are called "whole slide images" (WSIs) and are generally large in size (i.e., can be in the order of 100 megabytes and gigabytes).

Medical images are typically archived and may be retrieved for a later purpose (e.g., research or educational). Timely and consistent retrieval of archived images can likely assist with diagnosis. Similarly, many other sectors, such as, but not limited to, architectural and engineering design, geoinformatics, museum and gallery collections, retail catalogs, material processing, military and defense applications, surveillance and forensics, can also benefit from efficient and consistent management of image data.

The ability to efficiently identify archived images, and retrieve those images can be advantageous for these example sectors, amongst others. For example, in the medical field, as medical images are analyzed for a medical diagnosis, the medical images can be compared with archived images of diagnosed cases to assist with the diagnosis. Also, the present diagnosis can benefit from archived images, which may have been clinically evaluated and annotated for second opinions, research, or educational purposes.

Existing practices involve associating images with image descriptors that are searchable to assist with the management of the image data. Although some of these existing image descriptors may be automatically generated, they are typically generated based on features and/or qualities identified from human observations and judgement, such as keywords or tags. Such approaches requiring manual human annotation and judgement can be impractical in view of the large amount of image and video data that typically needs to be processed. In addition to the amount of time required for a human to observe and generate descriptive descriptors for the digital content, the descriptors may be inconsistent between medical facilities and equipment and may not be universal or adaptable between different systems.

In many image processing systems, the quality of the descriptors can be limited by the computer resources. Depending on the resolution of an image, existing image descriptors may be insufficient to accurately identify similar images. Existing image descriptors can be complex and involve computationally intensive calculations. The computational power may not readily be available and/or insufficient to handle the growing amount of digital content being generated. As well, the existing image descriptors can require large amount of storage capacity, which results in additional cost or may not be available at all.

Image characterization as used herein relates to representing image content (i.e., histologic features) in a manner such that image data can be accurately and efficiently processed and analyzed. Existing image characterization methods can split an image into many smaller sub-images (i.e., tiles or patches) and process a subset or all of the sub-images to enable image analytics.

Sub-images are typically selected at a preset magnification. For example, many applications can select sub-images at a magnification level of 20× or 40×. However, digital pathology can involve image analysis at magnification levels from 1× to 2.5×, 5×, 10×, 20× and higher. For example, pathologists may repeatedly examine multiple magnifications of the same specimen to better understand the specimen. This can involve transition between adjacent magnifications in order to see image features at high magnifications, such as details, and at low magnifications such as, but not limited to, tissue structures. Viewing an image at multiple magnifications can be a challenge for computers especially with respect to the large dimensions of the images.

Reference is first made to FIG. 1, which illustrates an example block diagram 100 of an image management system 110 in communication with an imaging device 120, a system storage component 140, and a computing device 150 via a network 130. Although only one imaging device 120 and one computing device 150 are shown in FIG. 1, the image management system 110 can be in communication with fewer or more imaging devices 120 and fewer or more computing devices 150. The image management system 110 can communicate with the devices 120, 150 over a wide geographic area via the network 130.

The imaging device 120 can include any device capable of capturing image data and/or generating images, and/or storing image data. For example, the imaging device 120 can be a digital pathology scanner.

As shown in FIG. 1, the image management system 110 includes a processor 112, a storage component 114, and a communication component 116. The image management system 110 may include one or more servers that may be distributed over a wide geographic area and connected via the network 130. In some embodiments, each of the processor 112, the storage component 114 and the communication component 116 may be combined into a fewer number of components or may be separated into further components.

The processor 112 may be any suitable processors, controllers, digital signal processors, graphics processing units, application specific integrated circuits (ASICs), and/or field programmable gate arrays (FPGAs) that can provide sufficient processing power depending on the configuration, purposes and requirements of the image management system 110. In some embodiments, the processor 112 can include more than one processor with each processor being configured to perform different dedicated tasks.

The processor 112 may be configured to control the operation of the image management system 110. The processor 112 can include modules that initiate and manage the operations of the image management system 110. The processor 112 may also determine, based on received data, stored data and/or user preferences, how the image management system 110 may generally operate.

The processor 112 can pre-process images. For example, the processor 112 can operate to stitch frames received from the imaging device 120 together to produce a whole slide image (i.e., digitized glass slide). The processor 112 can also, or alternatively, apply different processing techniques to the frames, including, but not limited to, field flattening, de-Bayering, sharpening, de-noising, color correction, and compression. The image management system 110 can then store the whole slide image into the storage component 114, for example. The image management system 110 can receive the frames directly from the imaging device 120—that is, the pre-processing component can be optional.

The processor 112 can generate image identifiers for each image. An image identifier can represent a content of the image that it is associated with. That is, an image identifier represents at least a portion of the image data of that image. For example, the image data (e.g., select features and/or portions) can be translated by the image management system 110 into an encoded representation as the image identifier. For example, the image identifier can be a numerical representation containing integer values and/or binary values.

By translating and storing the image data in association with image identifier, the processor 112 can then search the associated image data by searching a database of the associated image identifiers. For example, the processor 112 can compare and retrieve similar or related images by searching a database of the associated image identifiers. The database of the associated image identifiers can include a set of image identifiers for images for the purpose of comparison with other images having image identifiers. Typically, the database of image identifiers relates to images of the same modality. For example, a database of image identifiers can relate to human anatomical histopathology whole slide images with hematoxylin and eosin (H&E) staining. Each set of image identifiers defined for an image can be a function of the type and content of the image. A set of image identifiers can include one or more image identifiers. In some embodiments, a set of image identifiers can include hundreds of image identifiers for an image.

When generating an image identifier for an image, the processor 112 can populate the storage component 114 or the system storage component 140 with the image and/or the image identifier. For example, the communication component 116 can receive the image from the imaging device 120. The processor 112 can then process the image to generate an image identifier and store the image identifier along with the image. In some embodiments, the image identifier may be embedded as metadata in the image file. In some embodiments, the image identifiers can be stored separately from the images.

The processor 112 can operate to search the storage component 114 and/or the system storage component 140 using an image query based on the image identifier generated. As the image identifier represents a portion of each of the image, the image identifier includes less data than the complete frame or whole image. Searching with the image identifier can be faster than searching with the data associated with the complete frame or whole image.

When searching for an image and retrieving the image, the processor 112 can generate an image query based on the image identifier and initiate a search for the associated image in the storage component 114 or the system storage component 140. The image query generated by the processor 112 can search the storage component 114 or the system storage component 140 for similar image identifiers. The retrieved similar image identifiers can direct the processor 112 to the related images and/or reports associated with the related images stored in the storage component 114 or in the system storage component 140. The processor 112 can retrieve the related image and/or associated report with an image query search, for example.

The image(s) associated with the stored image identifiers identified by the processor 112 as similar can be useful to the user requesting the image query search by the image management system 110. In the medical imaging context, a medical professional (radiologist, pathologist, diagnostician, researcher, etc.) may scan a patient and use the image to search for more information about the patient's illness.

For example, the processor 112 can receive an image query that defines a size, shape, and location of a tumor. In some embodiments, the image query can originate from the computing device 150. The processor 112 can then initiate a search for images that satisfy that image query. When the image management system 110 receives the search results, the communication component 116 can display the resulting images to the user for review. In some embodiments, the resulting images can be displayed at the computing device 150. The image management system 110 can provide further information in respect of the results for the user, such as the medical case information of each result. Accordingly, the user can see how previous patients with a similar tumor were diagnosed, treated and evaluated.

The processor 112 can generate a report based on the imaging data received from the imaging device 120. For example, the reporting component can identify similar reports from the storage component 114 and extract relevant report data from the identified reports for generating the report for the imaging data received from the imaging device 120. An example report can include data related to various characteristics including, but not limited to, procedure type, specimen focality, tumor site, tumor focality, microscopic features of tumor, histologic type, histologic features, and histologic grade. In the medical context, reports can be obtained from another system, such as a hospital Laboratory Information System (LIS).

In some embodiments, the processor 112 can be separated into further components such as a pre-processing component, an indexing component, and a searching component which can be combined into a fewer number of components or may be separated into further components. Each component may also be implemented with hardware or software, or a combination of both. For example, one or more components can include computer programs executable by the processor 112 to conduct the relevant operations.

The communication component 116 may be any interface that enables the image management system 110 to communicate with other devices and systems. In some embodiments, the communication component 116 can include at least one of a serial port, a parallel port or a USB port. The communication component 116 may also include at least one of an Internet, Local Area Network (LAN), Ethernet, Firewire, modem, fiber, or digital subscriber line connection. Various combinations of these elements may be incorporated within the communication component 116.

For example, the communication component 116 may receive input from various input devices, such as a mouse, a keyboard, a touch screen, a thumbwheel, a track-pad, a track-ball, a card-reader, voice recognition software and the like depending on the requirements and implementation of the image management system 110.

The storage component 114 can include RAM, ROM, one or more hard drives, one or more flash drives or some other suitable data storage elements such as disk drives, etc. The storage component 114 is used to store an operating system and programs, for example. For instance, the operating system provides various basic operational processes for the processor. The programs include various user programs so that a user can interact with the processor to perform various functions such as, but not limited to, viewing and/or manipulating the image data as well as retrieving and/or transmitting image data as the case may be.

In some embodiments, the storage component 114 can store the images, information related to image identifiers of the images, information related to the database, and information related to the imaging devices 120.

The storage component 114 may include one or more databases (not shown) for storing image data, information relating to the image data, such as, for example, patient data with respect to the image data, information related to reports associated with the images, such as, for example, diagnoses with respect to the image data. For example, the storage component 114 can store image identifiers for the images. Each image identifier can also be associated with additional information, such as but not limited to information on the tissue type and cancer type, and can be accompanied by relevant pathology reports. When a search conducted by the image management system 110 identifies an image identifier with associated reports, a later review of the initial query image by the pathologist can benefit from the associated reports.

Similar to the storage component 114, the system storage component 140 can store images and information related to images. Images and information related to images can be stored in the system storage component 140 for retrieval by the computing device 150 or the image management system 110.

Images described herein can include any digital image with any number of pixels. The images can have any size and resolution. In some embodiments, the size and resolution of the image can be adjusted in one or more pre-processing stages. Example image pre-processing includes digital filtering for noise reduction.

An example image is a medical image of a body part, or part of a body part. A medical image can be generated using any modality, including but not limited to microscopy, X-ray radiography, magnetic resonance imaging (MRI), ultrasound, and/or computed tomography scans (CT scans). Microscopy can include, but is not limited to whole slide imaging, reflected light, brightfield, transmitted light, fluorescence, and photoluminescence.

The image can be a black and white, grey-level, RGB color, or false color image. An image data structure typically includes an intensity value at each pixel location. To capture a wide dynamic range of intensity values, the data structure of the image uses a number of data bits to represent each pixel.

As noted above, sub-images (i.e., patches or tiles) can be defined within images. The dimensions of a sub-image are generally smaller than the dimensions of the image itself. For example, sub-image can be defined as a small image for the purpose of dividing a larger image into a smaller size. For example, for a larger image having dimensions that are larger than 5000×5000 pixels, a sub-image can be defined as being 1000 pixels by 1000 pixels. In some embodiments, a sub-image can overlap with a neighboring sub-image—that is, a sub-image can include the same pixels as another sub-image of the same image. In some embodiments, sub-images of the same image may not overlap. For example, for an image of a 10 mm×10 mm tissue area (captured at 0.5 μm pixel resolution or 20× magnification), 400 non-overlapping sub-images having a size of 1000×1000 pixels can be defined.

In some embodiments, processing a plurality of sub-images can be faster than processing the image itself. In some embodiments, sub-images can contain unique features of the larger image that can be distinguished from other sub-images of the same larger image.

Images with high resolution are typically associated with large data files while images with lower resolution are associated with smaller data files size. Images or sub-images stored with a lower resolution, in part or whole, can be referred to herein as versions of the image or sub-image, respectively.

An image can belong to a dataset, that is, collection of related images that are composed of separate elements that can be accessed and processed individually or in combination by a processor 112 for the purpose of organizing them into groups or sets of similar images. For example, pathology brightfield whole slide images with hematoxylin and eosin staining can form a dataset of related images from different organs of the human body. Other example datasets can include fluorescence images of mouse brain tissue sections, or fluorescence images of immunohistochemical images for cancer diagnosis.

Information related to image identifiers of images that may be stored in the storage component 114 or the system storage component 140 may, for example, include but is not limited to the sub-images, features detected in the sub-images, clusters (i.e., groups of sub-images), representative sub-images of the clusters, features detected in the representative sub-images, encoded representations of the representative sub-images, including encoded representations containing integer values and/or binary values, such as barcodes. Barcodes can be, for example, a one-dimensional or a two-dimensional binary representation of unique image features for the purpose of creating an index to represent an image. Binary representations of image features can be generated by a thresholding algorithm of image feature vectors to map real-valued numbers to zeros and ones. Barcodes are generally used for computational purposes and a visual representation, such as a traditional barcode having a plurality of parallel lines of varying widths, can also be generated if necessary. Generally, an image can be represented by a finite number of barcodes.

Information related to image annotations that may be stored in the storage component 114 or the system storage component 140 may, for example, include but is not limited to text comments, audio recordings, markers, shapes, lines, free form mark-ups, and measurements.

Information related to imaging devices that may be stored in the storage component 114 or the system storage component 140 may, for example, include but is not limited to a device identifier, a device location, a device operator, a modality, supported image resolutions, supported image file types, image size range, image margin ranges, and an image scale range.

Information related to image subjects that may be stored in the storage component 114 or the system storage component 140 may, for example, include but is not limited to a patient identifier, a date of birth, gender, home address, primary physician, and medical team in the case of medical images.

Information related to the image database that may be stored in the storage component 114 or the system storage component 140 may, for example, include but is not limited to a similarity indicator and a relevancy indicator.

In some embodiments, the image management system 110 can receive images directly from the imaging device 120. For example, the image management system 110 can read images directly from a storage component of the imaging device 120. The image management system 110 may process query images, generate image identifiers, and retrieve similar images in real-time or nearly in real-time, as the query images are being received from the imaging device 120. By increasing the speed in which the query image can be reviewed and analyzed with respect to an archive of images in real-time, or near real-time, the image management system 110 can improve patient care and responsiveness.

In the context of the present disclosure, the terms "real-time" or "near real-time" is defined as image processing that is concurrent to, or within a small temporal window of, the query image acquisition or generation. The purpose of real-time or near real-time image processing is to deliver search and retrieval results from the image management system 110 to the user within seconds or minutes after a medical imaging scan of the patient. Accordingly, related medical case information may be delivered to the patient's doctor with minimal delay, for a timely diagnosis of the patient's illness.

In some embodiments, images can be loaded into the image management system 110 from the system storage component 140 or computing device 150 that is remote from the image management system 110. For example, the image management system 110 may be used to process offsite data. Processing offsite data or non-time-sensitive data can assist with various applications, such as research applications where real-time processing is not necessary, and/or medical diagnostic applications at areas (e.g., remote areas, underprivileged areas, underdeveloped areas, etc.) where real-time processing is not possible, or nearly impossible due to unreliable or slow communication networks. For research applications, a researcher tasked with processing hundreds or thousands of medical images would still benefit from the increased processing speed of the image management system 110 over conventional feature-based detection CBIR systems, even if the hundreds or thousands of medical images are not related to any patients awaiting diagnosis. In areas with unreliable and/or slow communication networks (e.g., remote areas, underprivileged areas, underdeveloped areas, etc.), the methods and systems described herein can facilitate retrieval of the related images even with the unreliable and/or slow communication networks.

The computing device 150 may be any networked device operable to connect to the network 130. A networked device is a device capable of communicating with other devices through a network such as the network 130. A network device may couple to the network 130 through a wired or wireless connection.

The computing device 150 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

In some embodiments, the computing device 150 may be a laptop, or a smartphone device equipped with a network adapter for connecting to the Internet. In some embodiments, the connection request initiated from the computing device 150 may be initiated from a web browser and directed at the browser-based communications application on the image management system 110.

The network 130 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the image management system 110, the imaging device 120, the system storage component 140, and the computing device 150.

Figure 2:
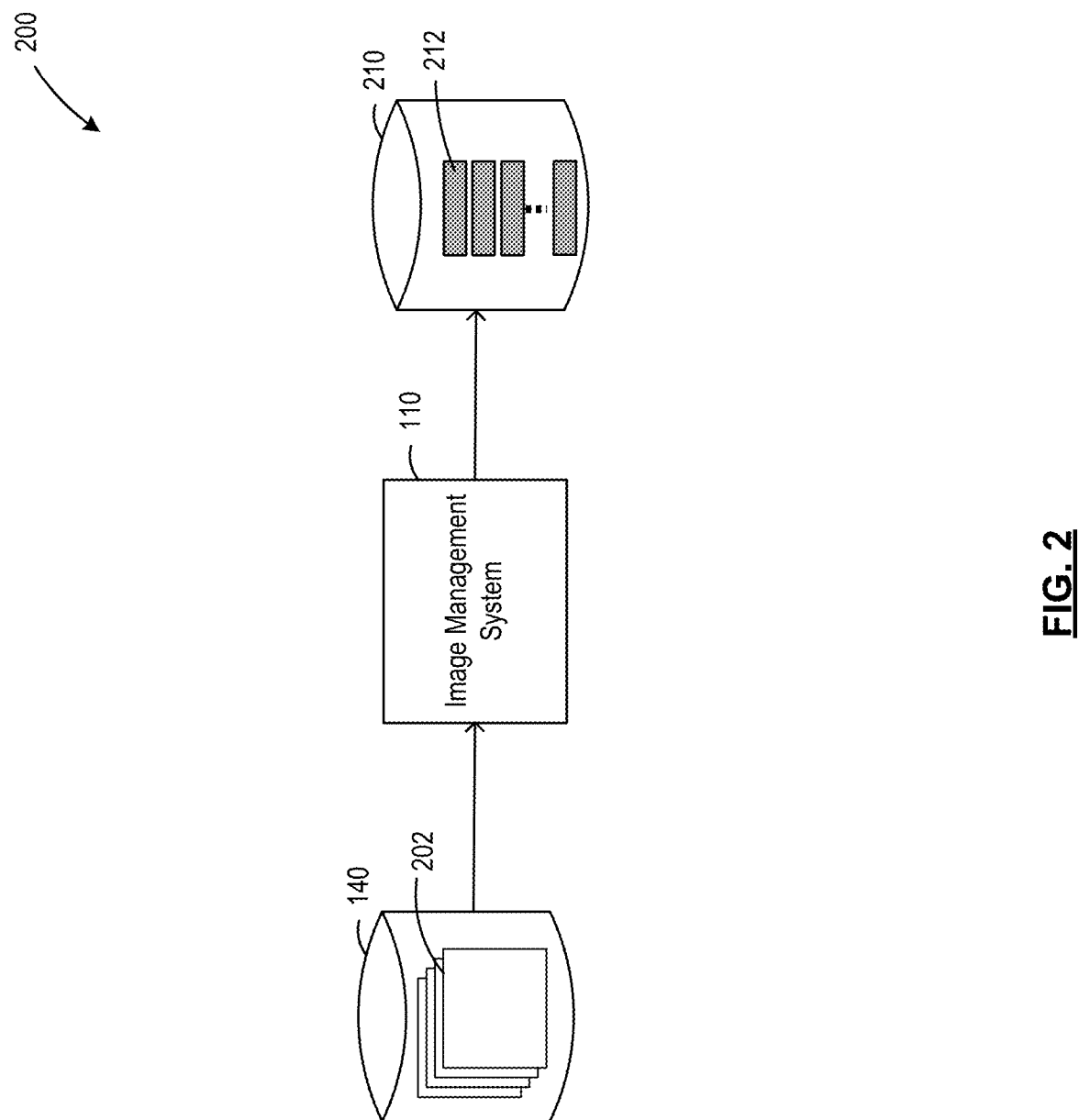
FIG. 2 is a schematic for generating image identifiers for a plurality of images, in accordance with an example embodiment.

Referring now to FIG. 2, shown therein is a schematic 200 illustrating an example of generating image identifiers for a plurality of images. Image identifiers can be used to locate images with similar image data within a database. The schematic 200 shows the generation of image identifiers 212 for a plurality of images 202. In other embodiments, an image identifier can be generated for a single image, such as a newly acquired image.

The plurality of images 202 can be stored in a database as an unindexed archive of images. As shown in FIG. 2, the plurality of images 202 can be stored in a storage component, such as system storage component 140. While the plurality of images 202 are shown as being stored in a single storage component for illustrative purposes, the plurality of images 202 can be stored in a plurality of storage components distributed over a network. The image management system 110 can access the plurality of images 202 in the system storage component 140.

The image management system 110 can use a processor, such as processor 112 (not shown in the schematic 200), to generate a plurality of image identifiers 212 for the plurality of images 202. One or more image identifiers can be generated for each image. Any appropriate techniques can be used for generating the image identifiers, including but not limited to segmentation, clustering, deep networks, and binarization algorithms. The image identifiers 212 can be stored in a storage component, such as storage component 210 dedicated to storing image identifiers. While FIG. 2 shows the storage component 210 as being a different storage component than the storage component in which the images are stored, in some embodiments, the image identifiers can be stored in the same storage component as the images. That is, in some embodiments, the image identifiers 212 can be stored in a storage component that is not dedicated to storing image identifiers, such as system storage component 140. While the plurality of image identifiers 212 are shown as being stored in a single storage component for illustrative purposes, the plurality of image identifiers 212 can be stored in a plurality of storage components distributed over a network.

The processor 112 can generate image identifiers for each image of the plurality of images sequentially, or in parallel. When the processor 112 generates image identifiers for two or more images in parallel, the processor 112 can receive the two or images simultaneously and generate image identifiers for each of the images simultaneously. When the processor 112 generates image identifiers for two or more images sequentially, the processor 112 can receive a first image and generate one or more image identifiers for the first image. Only after generating the one or more image identifiers for the first image, the processor 112 can receive a second image and generate one or more image identifiers for the second image.

It should be noted that an image can be characterized using multiple sample groups, where each sample group consists of multiple magnifications centered on a region of interest. That is, the example indexing shown in FIG. 2 can be implemented for each magnification of an image. The plurality of images 202 can be multiple versions of an image. While indexing each magnification of an image can provide a more complete representation of the image, such indexing can increase the storage requirement of indexing and reduce the computational efficiency of search and retrieval.

Figure 3:
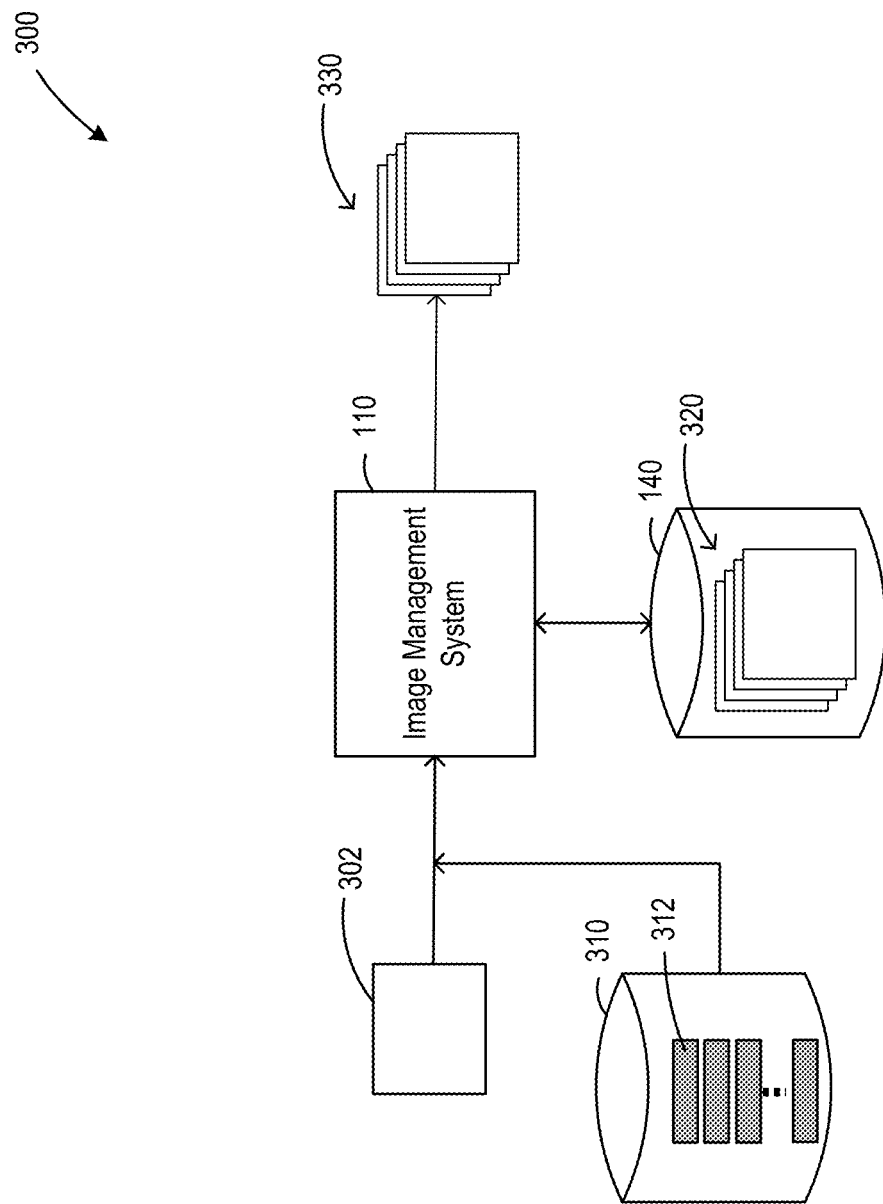
FIG. 3 is a schematic for searching within a database to locate images with similar image data as a query image, in accordance with an example embodiment.

Referring now to FIG. 3, shown therein is a schematic 300 illustrating an example search within a database to locate images with similar image data as a query image. The example schematic 300 shows the location of a plurality of images 330 with similar image data for a query image 302 using image identifiers 312.

The query image 302 can be a single query image. The database can be an indexed archive of images, such as the plurality of images 320. As shown in FIG. 3, the plurality of images 320 can be stored in a storage component, such as system storage component 140. While the plurality of images 320 are shown as being stored in a single storage component for illustrative purposes, the plurality of images 320 can be stored in a plurality of storage components distributed over a network.

An image identifier for the query image 302 and the plurality of images 320 can be stored in a storage component, such as storage component 310. Storage component 310 can be a storage component dedicated to storing image identifiers, such as storage component 310, or a storage component that also stores the plurality of images 320, such as system storage component 140. In other embodiments, the image identifier for the query image 302 is not stored and instead, the image management system 110 can generate an image identifier for the query image 302.

The image management system 110 can receive the query image 302 and the image identifier 312 for the query image and access the plurality of images 320 in the system storage component 140. The image management system 110 can use a processor, such as processor 112 (not shown in schematic 300), to locate a plurality of images 330 for the query image 302 based on the image identifier 312 and the image identifiers for the plurality of images 320. While FIG. 3 shows the plurality of images 330 being four images for illustrative purposes, fewer or more images can be located by the search.

In some embodiments, the processor 112 can sort the plurality of images 330. In some embodiments, the processor 112 can sort the plurality of images 320 in order of similarity. For example, the processor 112 can sort the plurality of images 320 in order of decreasing similarity to the query image 302.

In some embodiments, the processor 112 can identify one or more portions of image data of the query image 302 that is analogous to image data of an image of the plurality of images 320 having the greatest similarity to the query image. In some embodiments, the processor 112 can use the image identifiers 312 to identify one or more portions of image data of the query image 302 that is analogous to image data of an image of the plurality of images 320. For example, the processor 112 can determine that portions of image data of the query image 302 are similar to portions of image data of an image of the plurality of images 320 based on a measure of similarity between the image identifier for the query image 302 and the image identifier in storage component 310 for the image of the plurality of images 320.

It should be noted that the example search shown in FIG. 3 can be implemented with sub-images. That is, query image 302 can be a sub-image of a query image 302 and the plurality of images 320 can be sub-images of one or more images of the plurality of images 320.

It should be noted that the example search shown in FIG. 3 can be implemented with multiple versions of an image. That is, query image 302 can be a version of an image having a particular magnification and the plurality of images 320 include multiple versions of that image. Such indexing can reduce the computational efficiency of search and retrieval.

Figure 4:
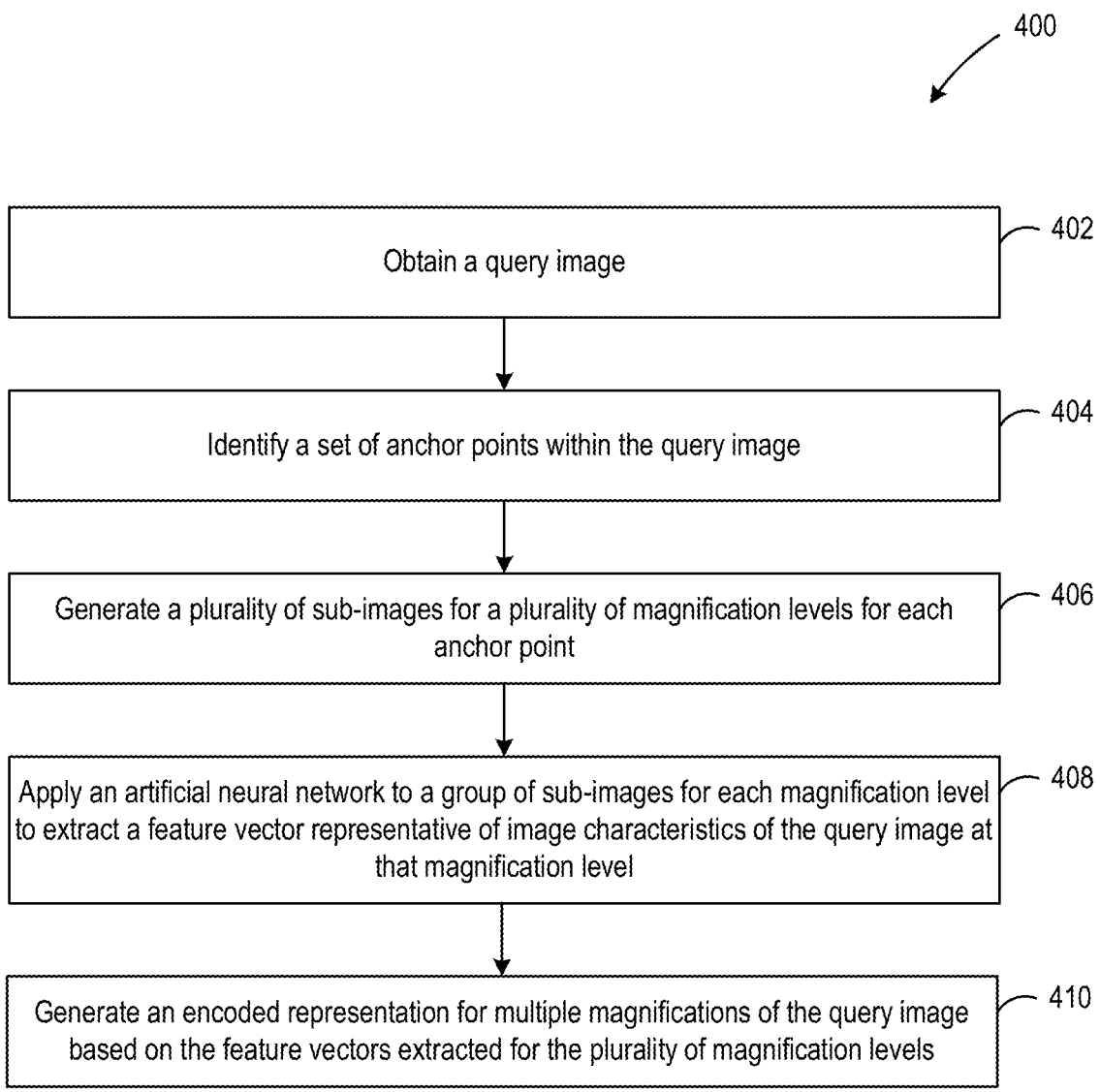
FIG. 4 is a flowchart of a method of generating encoded representations for multiple magnifications of one or more images, in accordance with an example embodiment.

Referring now to FIG. 4, an example method 400 of generating encoded representations for multiple magnifications of one or more query images is shown in a flowchart diagram. To assist with the description of the method 400, reference will be made simultaneously to FIG. 5A to FIG. 13. An image management system, such as image management system 110 having a processor 112 can be configured to implement method 400. Method 400 can be reiterated for each query image of the one or more query images.

Figure 5A:
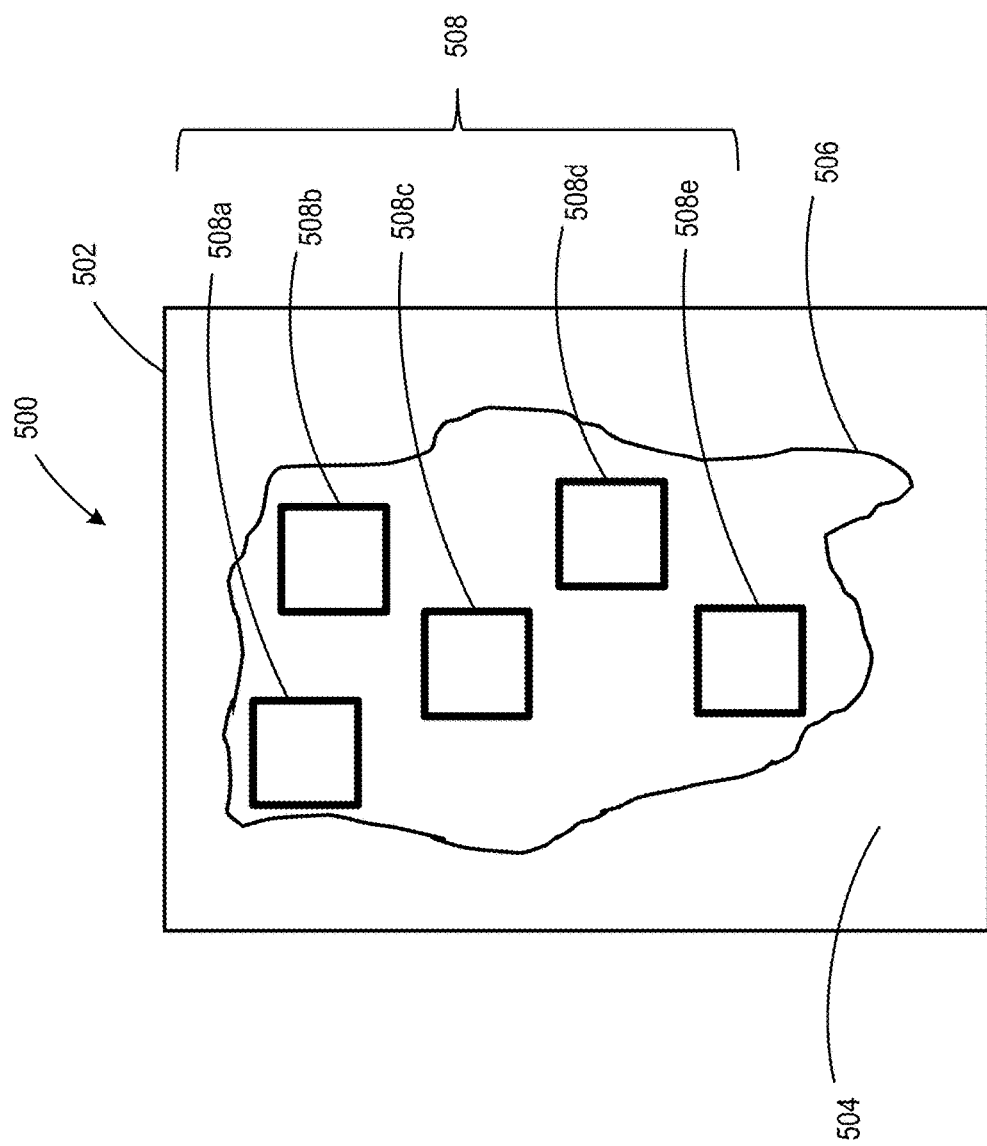
FIG. 5A is an illustration of an example set of preliminary sub-images of an example query image.

Method 400 can begin at 402, when the processor 112 obtains a query image, such as example query image 502 shown in illustration 500 of FIG. 5A. Although query image 502 is shown in FIG. 5A as being a medical image, and in particular, a histopathology image, the query image 502 can be any image. For example, the query image can be a satellite image.

Furthermore, although only one query image 502 is shown in FIG. 5A, the processor 112 can obtain one or more query images. The one or more query images can be obtained from an imaging device 120, a computing device 150, or a system storage component 140. The term "query image" used herein refers to an image for the purpose of using as an input to an operation performed by a processor, such as processor 112.

In some embodiments, the processor 112 can pre-process the query image. In some embodiments, the processor 112 can receive a pre-processed query image. For example, as shown in FIG. 5A, the query image 502 can include a background 504 and a foreground 506. In some embodiments, the processor 112 can segment the foreground of the query image, such as foreground 506 of query image 502, from a background of the query image, such as background 504. To segment the foreground 506 of the query image, the processor 112 can identify each pixel of the query image 502 as either a foreground pixel or a background pixel, based on the intensity value of that pixel location. When the query image is a medical image, the foreground 506 of image 502 can represent a specimen, such as a tissue sample.

In some embodiments, the processor 112 can define sub-images within the query image. The processor 112 can operate clustering techniques to select a mosaic of sub-images—that is, a plurality of sub-images—as preliminary sub-images to represent the query image. For example, the plurality of preliminary sub-images 508 can represent query image 502 of FIG. 5A. The plurality of preliminary sub-images 508 can include preliminary sub-images 508a, 508b, 508c, 508d, and 508e. While five preliminary sub-images are shown in FIG. 5A for illustrative purposes, fewer or more preliminary sub-images can be generated. Furthermore, while square-shaped preliminary sub-images are shown in FIG. 5A for illustrative purposes, other shapes are possible, including but not limited to circular, triangular, oval, and rectangular shaped preliminary sub-images.

At 404, the processor 112 can identify a set of anchors within the query image. An anchor can relate to coordinates within the query image or a point within the image. In some embodiments, the processor 112 can identify the set of anchor points from the foreground 506 of the query image 502.

Figure 5B:
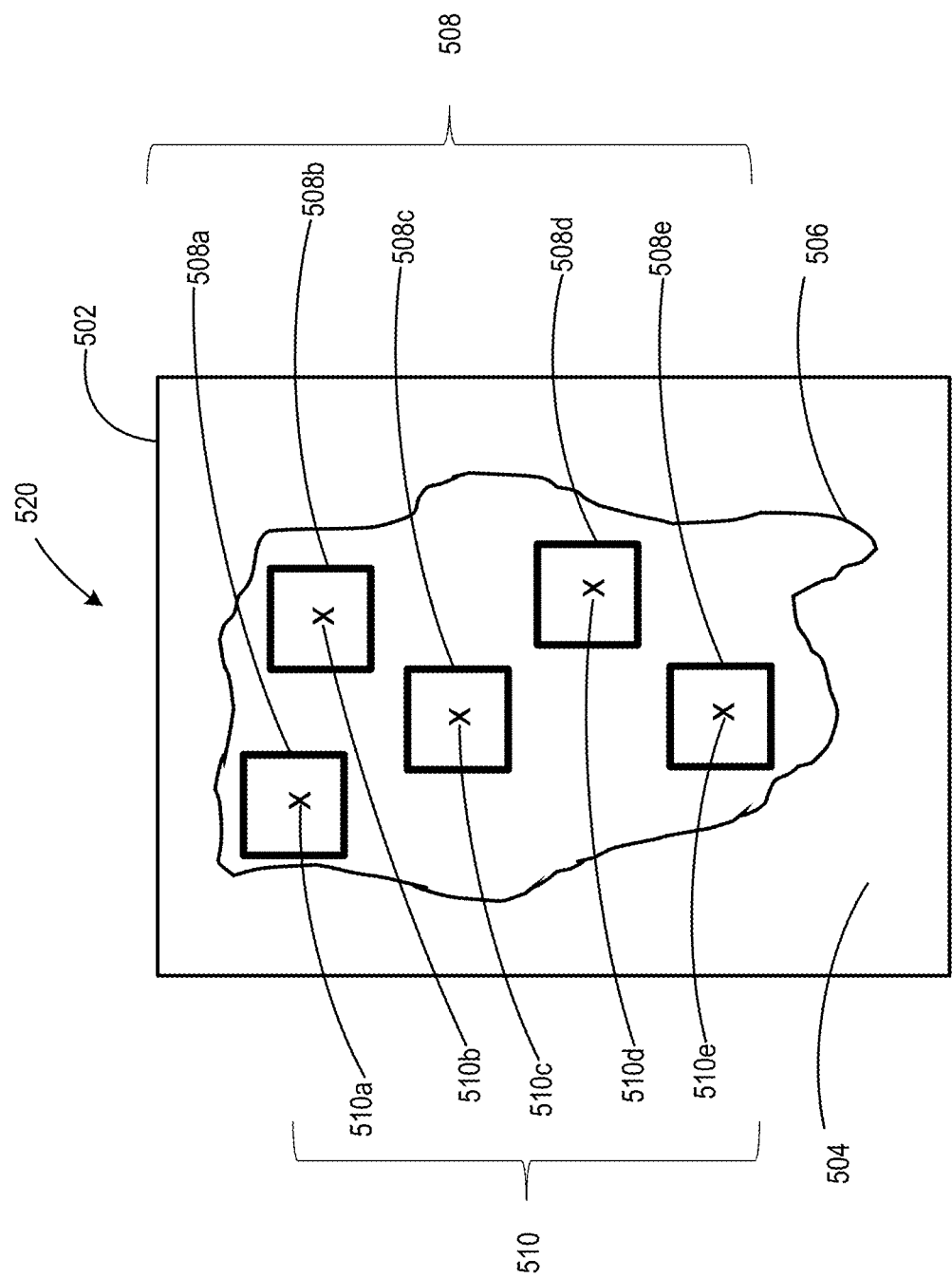
FIG. 5B is an illustration of an example set of anchor points of the example query image of FIG. 5A.

In some embodiments where a plurality of preliminary sub-images 508 for representing the query image has been generated, the centers of each preliminary sub-image of the plurality of preliminary sub-images 508 can be identified as an anchor point. For example, as shown in the illustration 520 in FIG. 5B, the processor 112 can identify anchor points 510a, 510b, 510c, 510d, and 510e corresponding to preliminary sub-images 508a, 508b, 508c, 508d, and 508e respectively. While five anchor points 510a, 510b, 510c, 510d, and 510e are shown in FIG. 5B for illustrative purposes, fewer or more anchor points can be identified.

At 406, the processor 112 can use the set of anchor points identified at 404 to generate a plurality of sub-images for a plurality of magnification levels. In particular, the coordinates of an anchor point can be used as a reference point to generate each sub-image of the plurality of sub-images for that anchor point. That is, each sub-image can be generated to have the same relationship to the anchor point. For example, in some embodiments, an anchor point can be used as the center point of each sub-image of the plurality of sub-images. As a result of using the anchor point as the center point of each sub-image, the sub-images generated will be concentric.

Figure 6:
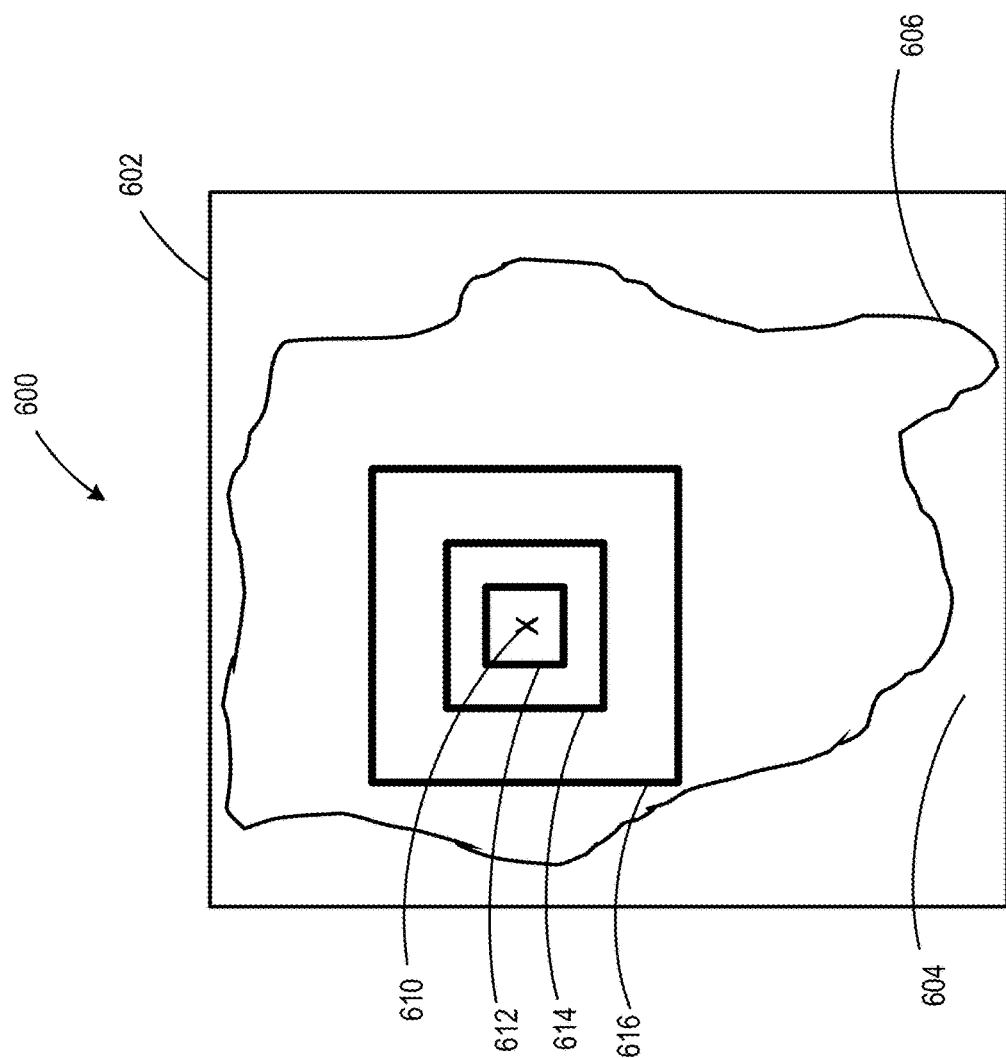
FIG. 6 is an illustration of an example of a plurality of initial sub-images for an example anchor point of FIG. 5B.

FIG. 6 shows an example illustration 600 of a plurality of initial sub-images 612, 614, and 616 generated for an anchor point 610 of image 602. As can be seen in FIG. 6, the anchor point 610 corresponds to the center point of each initial sub-image 612, 614, and 616. In this example, each pixel of image 602 is equal in size. That is, each pixel of image 602 corresponds to an area of the image that is equal in size. As well, initial sub-images 612, 614, and 616 have different dimensions (e.g., sizes characterized by pixels) and correspond to different size portions of the query image 602.

While each of initial sub-images 612, 614, and 616 are shown in FIG. 6 as corresponding to the foreground 606 of the query image 602 for illustrative purposes, in some embodiments, one or more of the initial sub-images 612, 614, and 616 can include portions of the background 604.

As noted above, initial sub-image 612 can be centered about anchor point 610. Initial sub-image 612 can correspond to a portion of the query image 602 having dimensions of n×n pixels (i.e., n pixels is the length of each side). Furthermore, initial sub-image 612 can correspond to a portion of the query image 602 that has an area of $n^2$.

Initial sub-image 614 can correspond to a portion of the query image 602 having dimensions of 2n×2n pixels (i.e., 2n pixels is the length of each side). That is, initial sub-image 614 can have larger dimensions characterized by pixels than initial sub-image 612. Furthermore, initial sub-image 614 can correspond to a portion of the query image 602 that has an area of $4n^2$. That is, initial sub-image 614 can cover an area that is four times the area covered by initial sub-image 612. As can be seen in FIG. 6, both of initial sub-images 612 and 614 can be centered about anchor point 610. As a result, initial sub-image 614 can include the portion of the query image 602 that is included in the initial sub-image 612. That is, initial sub-image 614 can overlap the entirety of initial sub-image 612.

Initial sub-image 616 can correspond to a portion of the query image 602 that has a size of 4n×4n pixels (i.e., 4n pixels is the length of each side) and a portion of the query image 602 that has an area of $16n^2$. That is, initial sub-image 616 corresponds to a portion of the query image that is larger than initial sub-image 614. Initial sub-image 616 can cover an area that is 16 times the area covered by initial sub-image 612 and 4 times the area covered by sub-image 614. As can be seen in FIG. 6, both of initial sub-images 614 and 616 can be centered about anchor point 610. As a result, initial sub-image 616 can include the portion of the query image 602 that is included in initial sub-image 614. That is, initial sub-image 616 can overlap the entirety of initial sub-image 614.

While three initial sub-images are shown in FIG. 6 for illustrative purposes, fewer or more sub-images can be generated. For example, in the case of FIG. 6 where the sub-image is square-shaped, a plurality of sub-images having dimensions characterized by m (n×n) pixels and an area of $m^2n^2$ can be generated, where m is a finite positive integer.

In some embodiments, the number of sub-images that can be generated can be limited by the location of the anchor point relative to the physical boundaries of the image. For example, a query image may be acquired at 40× magnification with a pixel resolution of 0.2 µm. A first initial sub-image of the query image can be generated with dimensions of 1000×1000 pixels. The first initial sub-image of the query image corresponds to a portion of the query image representing 200×200 µm and an area of 40,000 µm². A second initial sub-image of the query image can be generated with dimensions of 2000×2000 pixels, corresponding to a portion of the query image representing 400×400 µm and an area of 160,000 µm². A third initial sub-image of the query image can be generated with dimensions of 4000× 4000 pixels, corresponding to a portion of the query image representing 800×800 µm and an area of 640,000 µm².

In other embodiments, an anchor point can be used as a vertex of each sub-image of the plurality of sub-images. In some cases, it can be advantageous to use an anchor point as a vertex as opposed to a center point. For example, for pathology images with a tissue sample as the foreground 606 of the image 602, anchor points near the edge of the tissue sample can be used as vertices of sub-images to reduce the amount of background 604 in the plurality of sub-images and anchor points near the center of the tissue sample can be used as center points of the plurality of sub-images.

Figure 7:
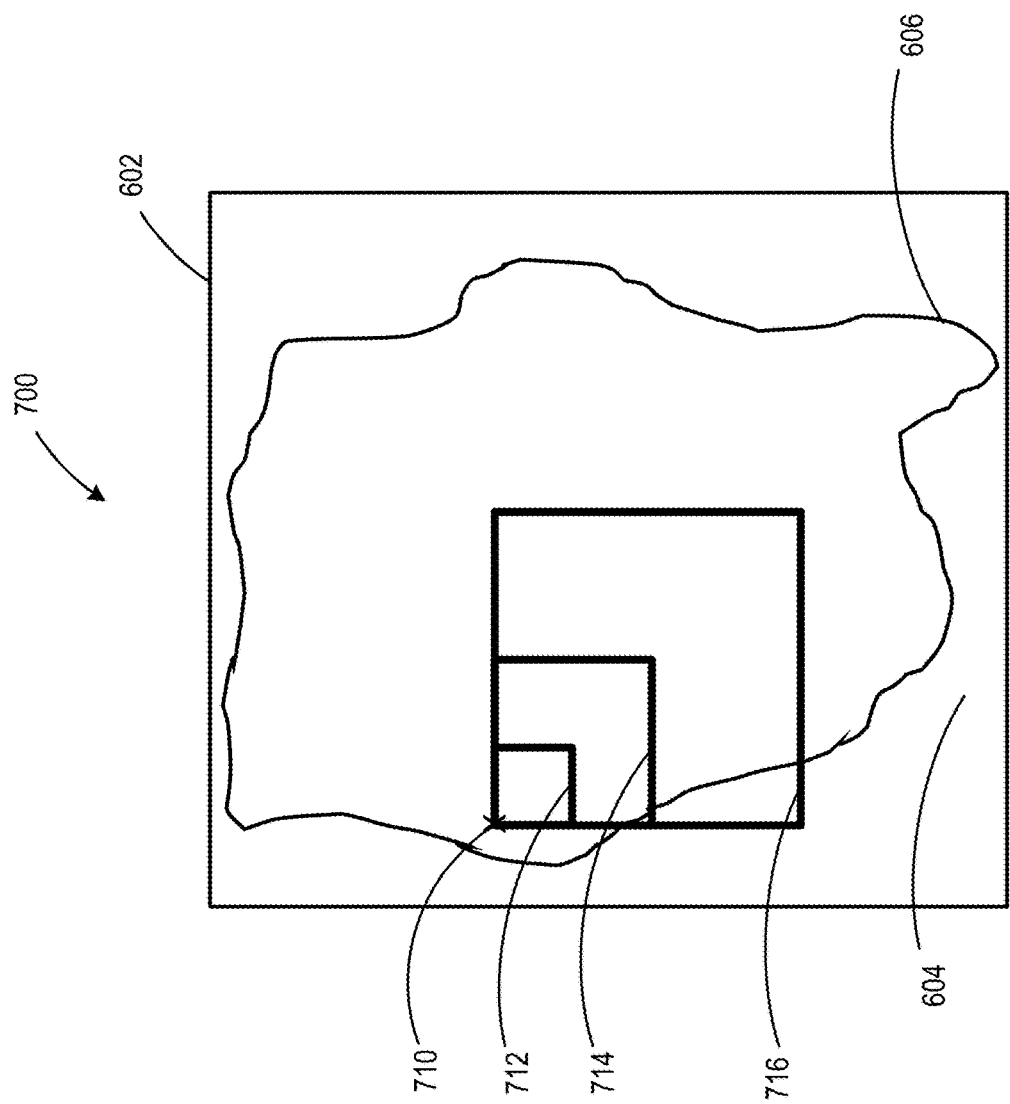
FIG. 7 is an illustration of another example of a plurality of initial sub-images for another example anchor point of the example query image of FIG. 5A.

For example, as shown in the illustration 700 in FIG. 7, the processor 112 can generate a plurality of initial sub-images 712, 714, and 716 in which the anchor point 710 corresponds to a vertex of each initial sub-image 712, 714, and 716. Furthermore, while anchor point 710 is shown as being the upper left corner of the plurality of initial sub-images 712, 714, and 716 for illustrative purposes, the anchor point 710 can be any vertex of the plurality of initial sub-images, such as the lower left corner, upper right corner, or lower right corner.

Figure 8A:
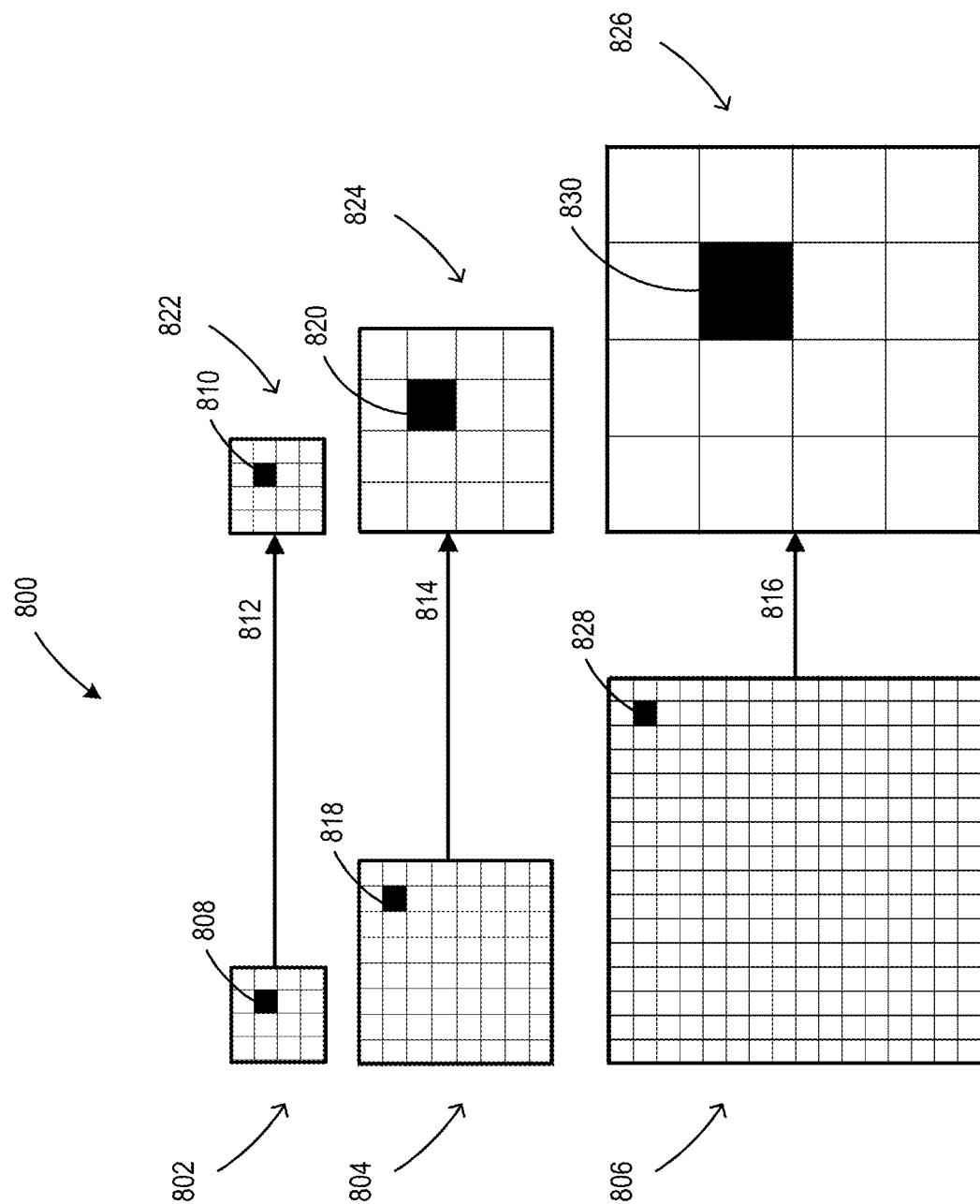
FIG. 8A is an illustration of an example of a plurality of sub-images generated from a plurality of initial sub-images of FIG. 6.
Figures 8B, 8C:
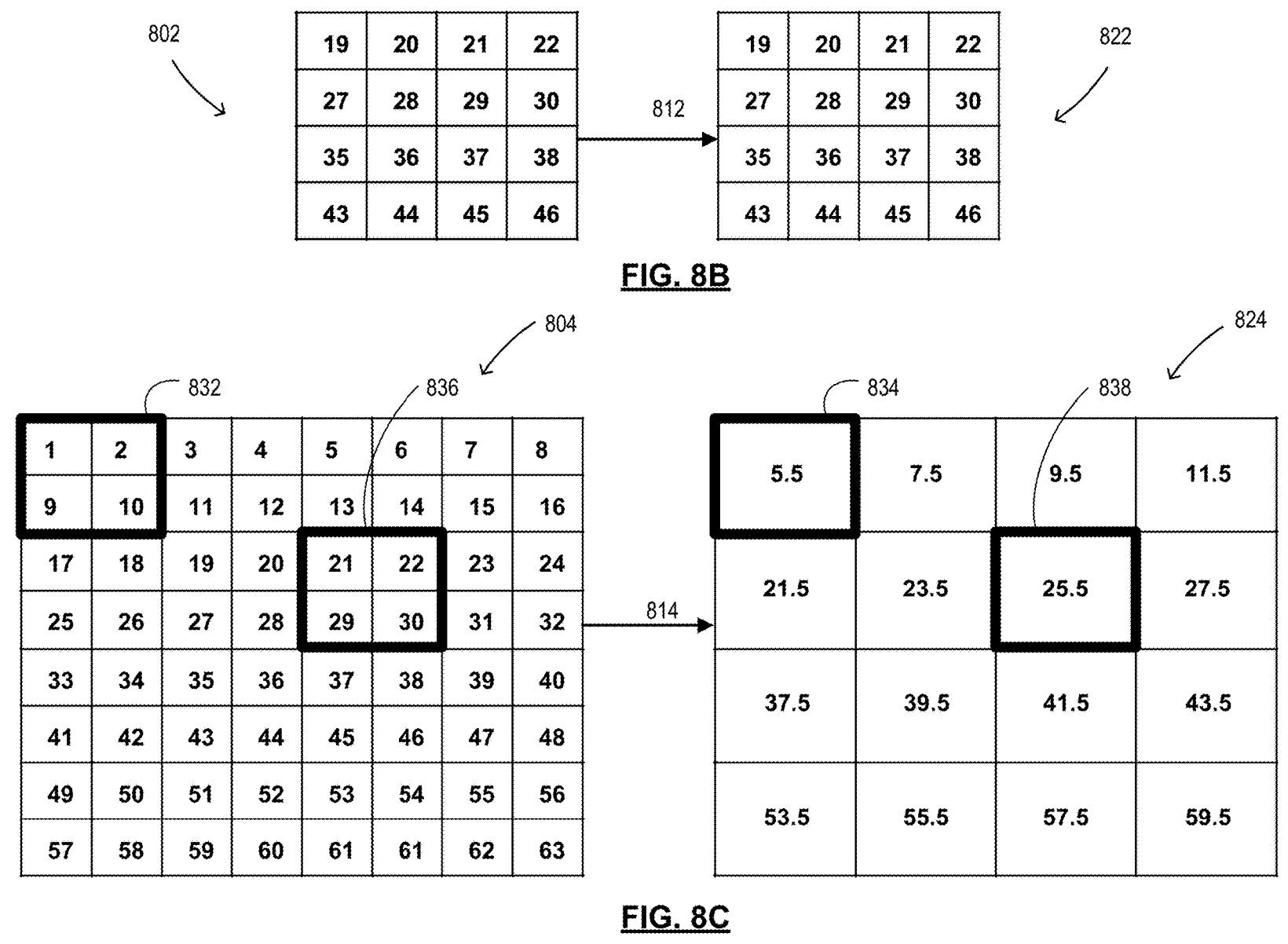

Referring now to FIGS. 8A, 8B, and 8C, shown therein are example illustrations for generating sub-images for a plurality of magnifications levels. Initial sub-images 802, 804, and 806 can be generated from an image having a high magnification, such as magnification M, which can be but is not limited to greater than 20× or 40×.

As shown in the illustration 800 of FIG. 8A, each of the initial sub-images 802, 804, and 806 can be obtained from the same magnification level and so each pixel 808, 818, 828 of the initial sub-images 802, 804, and 806 can be equal in size (e.g., size n).

In this example, sub-images 822, 824, and 826 are versions of initial sub-images 802, 804, and 806 respectively. That is, versions 822, 824, and 826 correspond to initial sub-images 802, 804, and 806 respectively at equal or lower magnification levels. Each of versions 822, 824, and 826 have the same number of pixels. To obtain versions 822, 824, and 826, operations 812, 814, and 816 can be applied to the initial sub-images 802, 804, and 806, respectively. The operations 812, 814, and 816 can convert or transform the size of the pixels in each of the initial sub-images 802, 804, 806 to a different size. The operations 812, 814, 816 can be a conversion or transformation of any sub-image at a first magnification level to another sub-image at a second magnification level that is equal to or lower than the first magnification level.

For example, the initial sub-image 802 can be used to generate version 822. In the example of FIG. 8A, the initial sub-image 802 can have dimensions characterized by n×n pixels. Likewise, version 822 can have dimensions characterized by n×n pixels. While version 822 is shown as having the same pixel size as the initial sub-image 802 in FIG. 8A for illustrative purposes, version 822 can have a different pixel size than the initial sub-image 802.

FIG. 8B shows an illustration of the application of example operation 812 to initial sub-image 802 to obtain version 822. The intensity value of each pixel of initial sub-image 802 and version 822 is shown. As can be seen, the pixels of version 822 correspond to the initial sub-image 802. That is, since version 822 has the same pixel size as the initial sub-image 802, the intensity values of the pixels of version 822 are equal to the intensity values of the pixels of the initial sub-image 802. Furthermore, each representative pixel has the same relative location within version 822 as the corresponding plurality of pixels has within the initial sub-image 802.

Referring back to FIG. 8A, the initial sub-image 804 can be used to generate version 824. The initial sub-image 804 can have dimensions characterized by 2n×2n pixels. To generate version 824 having dimensions characterized by n×n pixels, similar to version 822, an operation 814 can be applied to the initial sub-image 804. The operation 814 can generate a version 824 having representative pixels 820. Each pixel 820 of version 824 can correspond to four pixels 818 of the initial sub-image 804. That is, the operation 814 can be a 4:1 conversion or transformation. The portion of the query image that version 824 corresponds to remains the same as the portion of the query image that initial sub-image 804 corresponds to.

In the case that initial sub-image 804 has similar dimensions and pixel resolution of 0.2 µm as that of initial sub-image 614—that is, the second initial sub-image 804 corresponds to a portion of the query image representing 400×400 µm and an area of 160,000 µm²—a 4:1 transformation of pixels 818 of initial sub-image 804 can result in representative pixels 820 of version 824 having a pixel resolution of 0.4 μm. As shown, version 824 has a different pixel size than initial sub-image 804. Furthermore, version 824 has dimensions characterized by n×n pixels, similar to version 822. However, the portion of the query image that version 824 corresponds to remains the same. That is, version 824 corresponds to the portion of the query image representing 400×400 μm and an area of 160,000 μm².

In some embodiments, representative pixels 820 of version 824 can be a subsampling or downsampling of pixels 818 of the initial sub-image 804. The terms subsampling and downsampling (also referred to as sampling) as used herein can refer to representing a plurality of pixels with fewer pixels. In some embodiments, the intensity value of the representative pixels of the version of the initial sub-image are based on the intensity values of the plurality of pixels of the initial sub-image.

In at least one embodiment, a plurality of pixels of the initial sub-image can be represented by a representative pixel of the version of the initial sub-image. The intensity value of a representative pixel of the version can be an average, such as the mean of the intensity values of the plurality of pixels of the initial sub-image. In some embodiments, the intensity value of a representative pixel of the version can be the median or the mode of the intensity values of the plurality of pixels of the initial sub-image.

FIG. 8C shows an illustration of the application of example operation 814 to initial sub-image 804 to obtain version 824. The intensity value of each pixel of initial sub-image 804 and version 824 is shown. Each plurality of pixels 832, 836 of the initial sub-image 804 can be represented by a respective representative pixel 834, 838 in version 824. Furthermore, each representative pixel 834, 838 has the same relative location within version 824 as the corresponding plurality of pixels 832, 836 has within the initial sub-image 824, respectively.

For illustrative purposes, the intensity values of each of the representative pixels 834, 838 in version 824 is shown in FIG. 8C as being the mean of the intensity values of the respective plurality of pixels 832, 836 of the initial sub-image 804. While FIG. 8C shows the pixels in the initial sub-image 804 being subsampled equally along both the x-dimension and y-dimension of the initial sub-image (i.e., 2×2 pixels), other methods for sampling are possible. For example, the pixels 818 in the initial sub-image 804 may be sampled in only the x-dimension of the initial sub-image (i.e., 4×1 pixels) or in only the y-dimension of the initial sub-image (i.e., 1×4 pixels).

Furthermore, while FIG. 8C shows a sampling of four pixels in the initial sub-image 804 for illustrative purposes, fewer or more pixels can be subsampled. For example, referring back to FIG. 8A, the initial sub-image 806 can be used to generate version 826. Initial sub-image 806 can have dimensions characterized by 4n×4n pixels. To generate version 826 having dimensions characterized by n×n pixels, similar to version 822, an operation 816 can be applied to the initial sub-image 806. The operation 816 can generate a version 826 having representative pixels 830. Each pixel 830 of version 826 can correspond to 16 pixels 828 of the initial sub-image 806. That is, the operation 816 can be a 16:1 conversion. The portion of the query image that version 826 corresponds to remains the same as the portion of the query image that initial sub-image 806 corresponds to.

In the case that initial sub-image 806 has similar dimensions and pixel resolution of 0.2 μm as that of initial sub-image 616—that is the third sub-image 806 corresponds to a portion of the query image representing 800×800 μm and an area of 640,000 μm²—a 16:1 transformation of pixels 828 of initial sub-image 806 can result in representative pixel 830 of version 826 having a pixel resolution of 0.8 μm. As shown, version 826 has a different pixel size than initial sub-image 806. Furthermore, version 826 has dimensions characterized by n×n pixels, similar to version 822 and 824. However, the portion of the query image that version 826 corresponds to remains the same. That is, version 826 corresponds to the portion of the query image representing 800×800 μm and an area of 640,000 pmt.

In other embodiments, more than one representative pixel can be used to represent a plurality of pixels of the initial sub-image. Some embodiments can involve a different magnification conversion. For example, for a 5:1 conversion, a plurality of pixels having dimensions of 5×3 pixels in an initial sub-image can be subsampled along both the x-dimensions and y-dimensions and be represented by 3×1 pixels in a version of the initial sub-image. That is, 15 pixels of the initial sub-image can be represented by three representative pixels of the version of the initial sub-image. The three representative pixels of the version of the initial sub-image can have intensity values corresponding to a highest intensity value, a lowest intensity value, and average intensity value. The location of each of the three representative pixels in the version of the initial sub-image to one another can depend on the location of the pixel having the highest intensity value in the initial sub-image relative to the location of the lowest intensity value in the plurality of pixels that they represent in the initial sub-image.

Figure 9B:
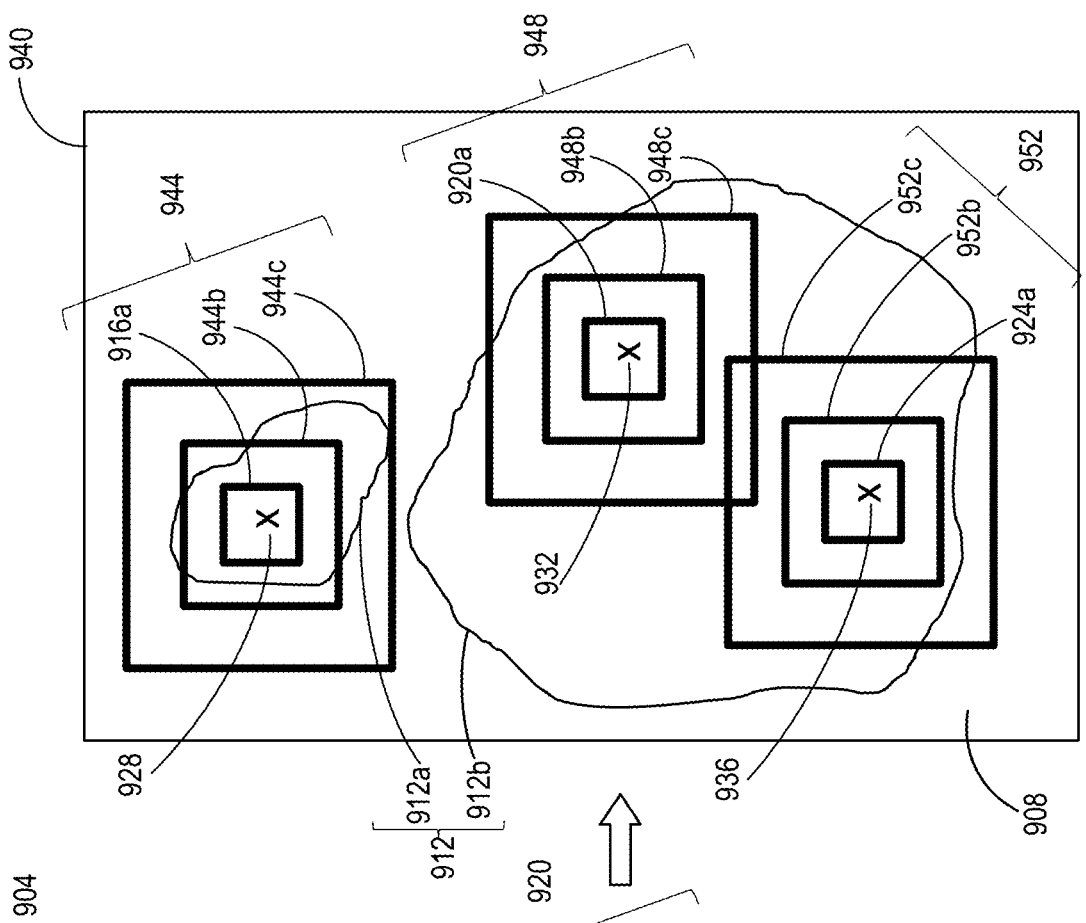
FIG. 9B is an illustration of an example of a plurality of sub-images for the example set of anchor points of FIG. 5B.
Figure 9A:
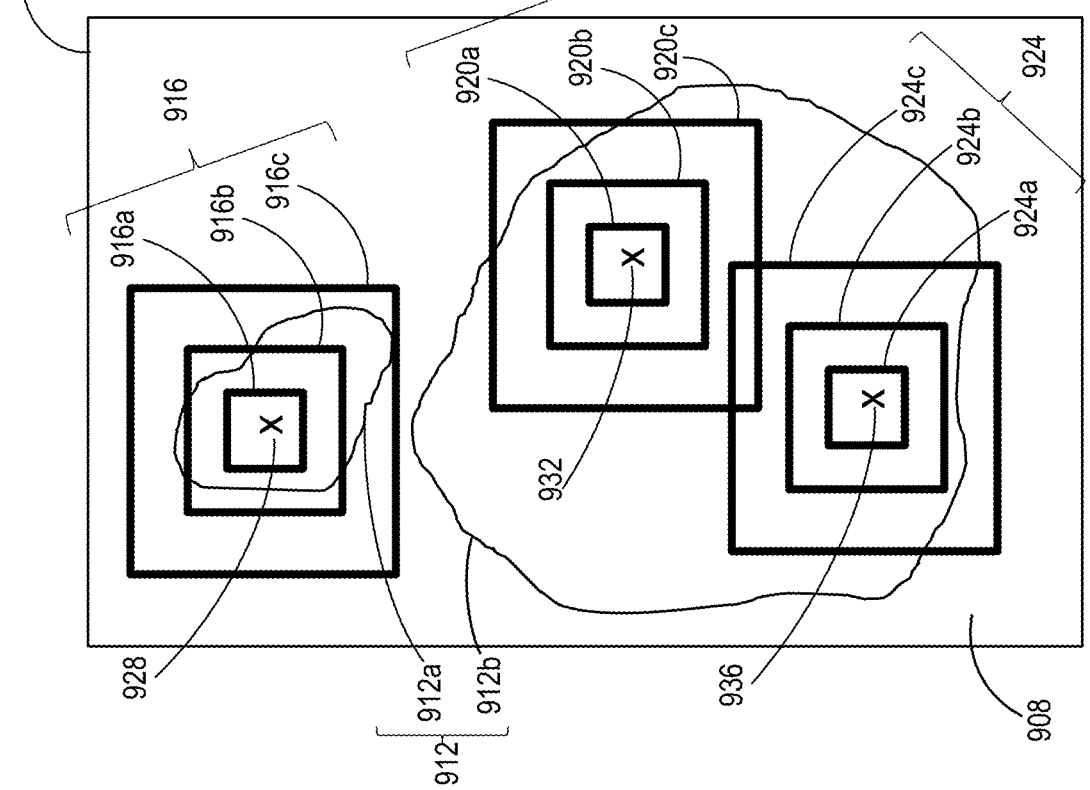
FIG. 9A is an illustration of an example of a plurality of initial sub-images for the example set of anchor points of FIG. 5B.

Referring now to FIGS. 9A and 9B, shown therein is another example illustration for generating sub-images for a plurality of magnification levels. Similar to image 502 and 702, image 904 can be obtained at 402. The image 904 can include a background 908 and a foreground 912 having two regions of interest 912a and 912b. The image 902 can have a high magnification, such as but not limited to 20× or 40×.

Anchor points 928, 932, and 936 can be identified at 404. The anchor points 928, 932, and 936 can be identified to as center points at which to generate a plurality of sub-images at multiple magnifications.

For each anchor point 928, 932, and 936, the processor 112 can generate a plurality of sub-images. For example, for anchor point 928, a plurality of concentric initial sub-images 916a, 916b, 916c centered about anchor point 928 can be generated. Similarly, a plurality of concentric initial sub-images 920a, 920b, and 920c centered about anchor point 932 and a plurality concentric initial sub-images 924a, 924b, and 924c centered about anchor point 936 can be generated.

As illustrated in FIG. 9A, initial sub-images 916a, 920a, 924a can have the same dimensions and area size at the magnification of the image 904. Similarly, initial sub-images 916b, 920b, 924b can have the same dimensions and area size at the magnification of the image 904 and initial sub-images 916c, 920c, 924c can have the same dimensions and area size at the magnification of the image 904. For example, initial sub-images 916a, 920a, 924a can each have dimensions characterized by n×n pixels and an area size of A at the magnification of the image 904; initial sub-images 916b, 920b, 924b can each have dimensions of 2n×2n pixels and an area size of 4A at the magnification of the image 904; and initial sub-images 916c, 920c, 924c can each have dimensions characterized by 4n×4n pixels and an area size of 16A at the magnification of the image 904.

The method of determining the size of initial sub-images for an anchor point can be generalized. For example, an initial square-shaped sub-image with dimensions characterized by n×n pixels and an area of A at magnification M can be generated. Additional initial sub-images can be generated by increasing the size of the sub-images by a factor of k, where k is a finite positive integer. Thus, the additional initial sub-images can have dimensions of k(n×n) pixels and an area of Ake (denoted as area A').

Each of initial sub-images 916a, 916b, 916c, 920a, 920b, 920c, 924a, 924b, and 924c of image 904 in FIG. 9A can be used to generate respective versions 916a, 944b, 944c, 920a, 948b, 948c, 924a, 952b, and 952c in version 940 as shown in FIG. 9B. For example, the operation described with respect to FIG. 8A to 8C can be applied to initial sub-images of FIG. 9A to generate versions shown in FIG. 9B at 406. As can be seen in FIG. 9B, each version of an initial sub-image corresponds to the same area size as the initial sub-images 916a, 916b, 916c, 920a, 920b, 920c, 924a, 924b, and 924c. However, to obtain the same number of pixels in each sub-image, the magnification of each sub-image remains the same or is decreased based on the operation applied.

As can be seen in FIG. 9B, version 940 includes a background 908 and a foreground 912 having two regions of interest 912a and 912b, similar to image 904. After the operation, each sub-image of version 940 has an equal number of pixels, despite corresponding to different area sizes of the image. For example, each sub-image of the plurality of sub-images 916a, 944b, and 944c (collectively referred to as plurality of sub-images 944) have the same number of pixels, namely n×n pixels. Likewise, each sub-image of the plurality of sub-images 920a, 948b, and 948c (collectively referred to as a plurality of sub-images 948) and the plurality of sub-images 924a, 952b, and 952c (collectively referred to as a plurality of sub-images 952) also have n×n pixels.

Each plurality of sub-images 944, 948, and 952 can include a sub-image at each of the different magnifications: M (i.e., the original magnification), M/2, and M/4. That is, sub-images 916a, 920a, and 924a have a magnification of M; sub-images 944b, 948b, and 952b have a magnification of M/2; and sub-images 944c, 948c, and 952c have a magnification of M/4.

Likewise, each plurality of sub-images 944, 948, and 952 include a sub-image at each of the different area sizes: A (i.e., the initial sub-image area size), 4A, and 16A. That is, sub-images 916a, 920a, and 924a have an area A; sub-images 944b, 948b, and 952b have an area 4A; and sub-images 944c, 948c, and 952c have an area 16A.

The operation to generate representative pixels from pixels of the initial sub-images, such as but not limited to operations 812, 814, and 816, can allow for flexibility in generating sub-images at different magnifications. This can be advantageous in medical imaging and particularly in pathology where the analysis of image at different magnifications can be important for making diagnoses.

For example, digital pathology images are typically acquired at 40× magnification but on occasion pathologists can require 20×, 10× and even 5× magnifications in combination with 40×, to diagnose the disease, including the level of the disease. Furthermore, as imaging technologies evolve new, higher resolution imaging devices may acquire images at magnifications of 75×, 85×, or 100×. For images captured at such high magnification, lower magnification sub-images having magnification levels of, for example, 40× and 20× can be generated. That is, while it is possible to generate additional versions of the image having a magnification of M/2 or M/4, the additional versions of the image are not limited to such fractions of the initial magnification.

Generally, there are no limitations to the number of sub-images selected to represent an image. However, the number of sub-images selected to represent an image can depend on the size of the image. While it is generally desirable to generate sub-images with minimal portions of background 908, in some cases, sub-images, particularly those at lower magnifications, can include small regions of background. For example in FIG. 9A, sub-images 916b and 916c can include portions of the background 908 of image 904.

In addition, the number of sub-images can be increased to cover the entire region of interest, particularly at lower magnifications. Based on the shape of the region of interest, some of the sub-images can overlap with each other. For example, as shown in FIG. 9A, initial sub-images 920c and 924c can overlap. The amount of overlap can depend on the type of image under investigation. The ability to use overlapping sub-images can be advantageous for pathology images (WSIs) where each region of interest within an image can be important for diagnosis.

Referring back to FIG. 4 now, at 408, for each magnification level, the processor 112 can apply an artificial neural network (ANN) to sub-images corresponding to that magnification level to extract a feature vector representation of image characteristics of the query image at that magnification level.

Figure 10:
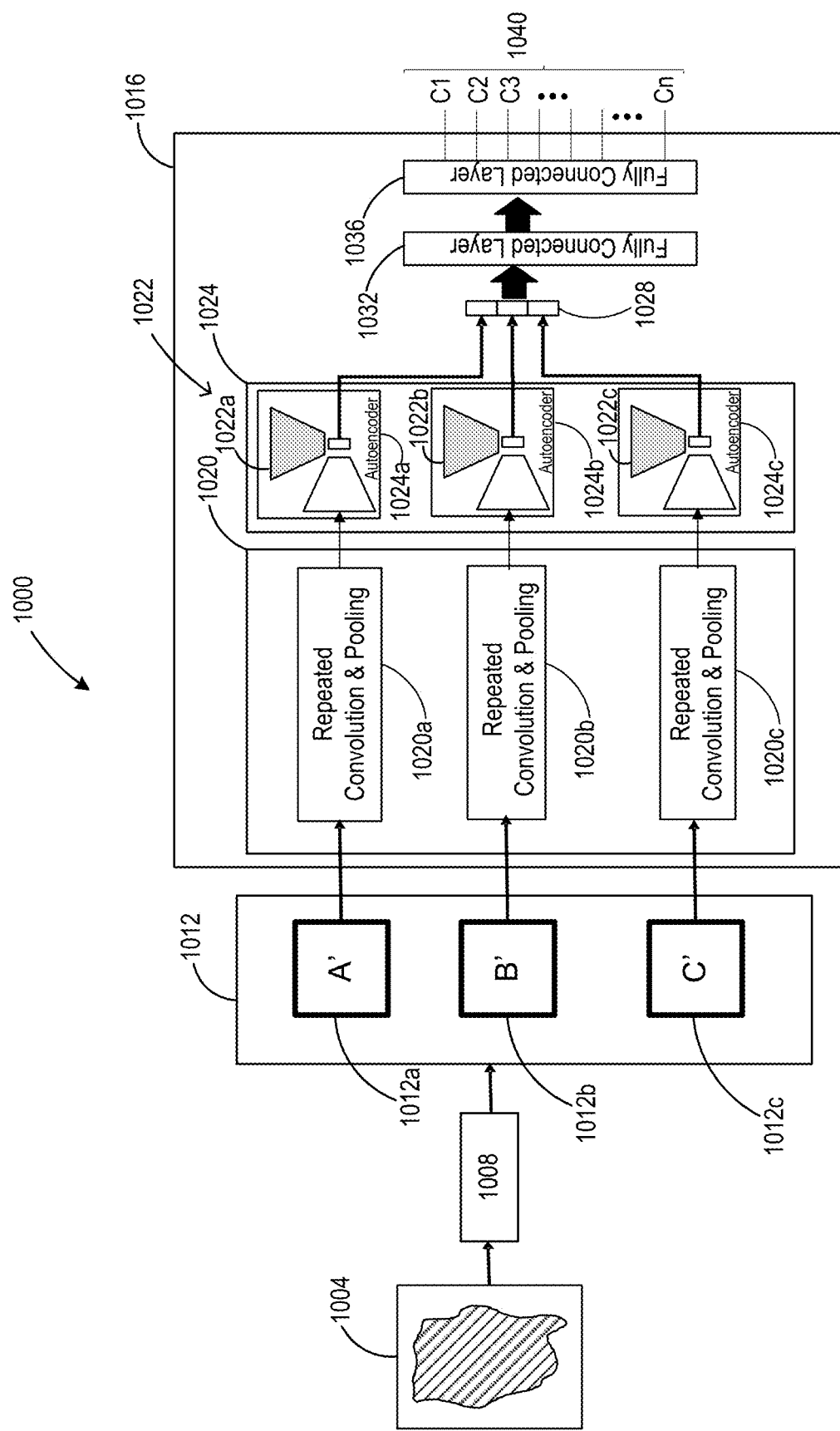
FIG. 10 is a block diagram of a method for generating encoded representations for multiple magnifications of one or more images, in accordance with an example embodiment.

FIG. 10 shows a first example block diagram 1000 of an ANN that can be used to extract a feature vector representation of image characteristics of a query image at 408. Query image 1004 can be, for example, query image 502, 702, or 904. While query image 1004 is shown in FIG. 10 as being a medical image for illustrative purposes, and in particular, a pathology image, the query image 1004 can be any type of image.

At 1008, the processor 112 can apply operations to the query image 1004 to generate sub-images having different magnifications 1012a, 1012b, and 1012c (collectively referred to as 1012). For example, operations 1008 can include the sampling operations described in respect of FIG. 8A to 8C. That is, versions 1012 can each have the same number of pixels (i.e., n×n pixels) but correspond to different magnifications and area sizes. Version 1012a corresponds to a first magnification, such as M, and has an area of A'. Version 1012b corresponds to a second magnification, such as M' (which can be lower than M) and has an area of B' (which can be larger than A'). Version 1012c corresponds to a third magnification, such as M" (which can be lower than each of M and M') and has an area of C' (which can be larger than each of A' and B'). While only three versions 1012a, 1012b, and 1012c are shown in FIG. 10 for illustrative purposes, fewer or more versions can be generated.

The plurality of sub-images at different magnifications 1012 can be input to an ANN. The ANN can be a deep ANN, such as deep ANN 1016. Deep ANN 1016 can be trained to extract a multi-magnification feature vector 1028 or classes 1040. The ANN 1016 can include a plurality of convolution and pooling blocks 1020a, 1020b, and 1020c (collectively referred to as 1020).

While only three convolution and pooling blocks 1020a, 1020b, and 1020c are shown in FIG. 10 for illustrative purposes, the ANN 1016 can include fewer or more convolution and pooling blocks 1020. Convolution and pooling operations of different groups of sub-images (i.e., different magnifications) can take place sequentially or in parallel. In some embodiments, there can be fewer convolution and pooling blocks 1020 than the number of different magnifications. In such cases, the convolution and pooling operations for different magnifications can take place sequentially. In some embodiments, the number of convolution and pooling blocks 1020 can correspond to the number of different magnifications of the plurality of sub-images. That is, the plurality of sub-images can be grouped by magnification levels. Each group of sub-images having the same magnification level can be input to a convolution and pooling block of the deep ANN 1016. In the example of FIG. 10, convolution and pooling operations 1020 for different magnifications are shown as being parallel operations at 1020a, 1020b and 1020c to increase speed of the computational process.

Autoencoders 1024a, 1024b, and 1024c (collectively referred to as 1024) can compress the extracted feature vectors of the last pooling layer of 1020a, 1020b and 1020c respectively. Each of the autoencoders 1024a, 1024b, and 1024c can include a respective decoder 1022a, 1022b, and 1022c (collectively referred to as decoders 1022) that can be used during training of the ANN 1016. Autoencoding operations of different groups of sub-images (i.e., different magnifications) can take place sequentially or in parallel. In the example of FIG. 10, autoencoding operations 1024 for different magnifications are shown as being parallel operations 1024a, 1024b, and 1024c to increase speed of the computational process. In some embodiments, principal component analysis (PCA) can be used to compress the extracted feature vectors of the last pooling layer of 1020a, 1020b and 1020c instead of autoencoders.

While both the convolution and pooling operations 1020 and the autoencoding operations 1024 are shown in FIG. 10 as being parallel operations, in some embodiments, one or both of the convolution and pooling operations 1020 and the autoencoding operations 1024 can be sequential operations.

Referring back to FIG. 4 now, at 410, an encoded representation for multiple magnifications of the query image can be generated based on the feature vectors extracted for the plurality of magnification levels.

For example, in the example of FIG. 10, the feature vectors obtained from the deepest (e.g., smallest) layer of the autoencoders 1024 can be concatenated together to provide a single feature vector 1028. That is, the single feature vector 1028 can include compressed (autoencoded) features of all magnifications 1024a, 1024b, and 1024c.

Feature vector 1028 can also be used in two fully connected layers 1032, 1036 to classify the sub-images 1012 into one of n classes: C1, C2, C3 . . . , Cn at 1040. Classification can involve categorizing feature vectors into classes to represent the image. Classes can represent predictions (e.g., a probabilities) that an image characteristic is present in the image. Neural networks can be used for classification. While two fully connected layers are shown in FIG. 10 for illustrative purposes, one or more fully connected layers can be used.

The feature extraction and classification is repeated for all sub-images of the plurality of sub-images generated for the image 1004. Either the concatenated feature vector 1028 or the first fully connected layer 1040 can be used as an encoded representation, or image identifier for the query image 1004.

Figure 11:
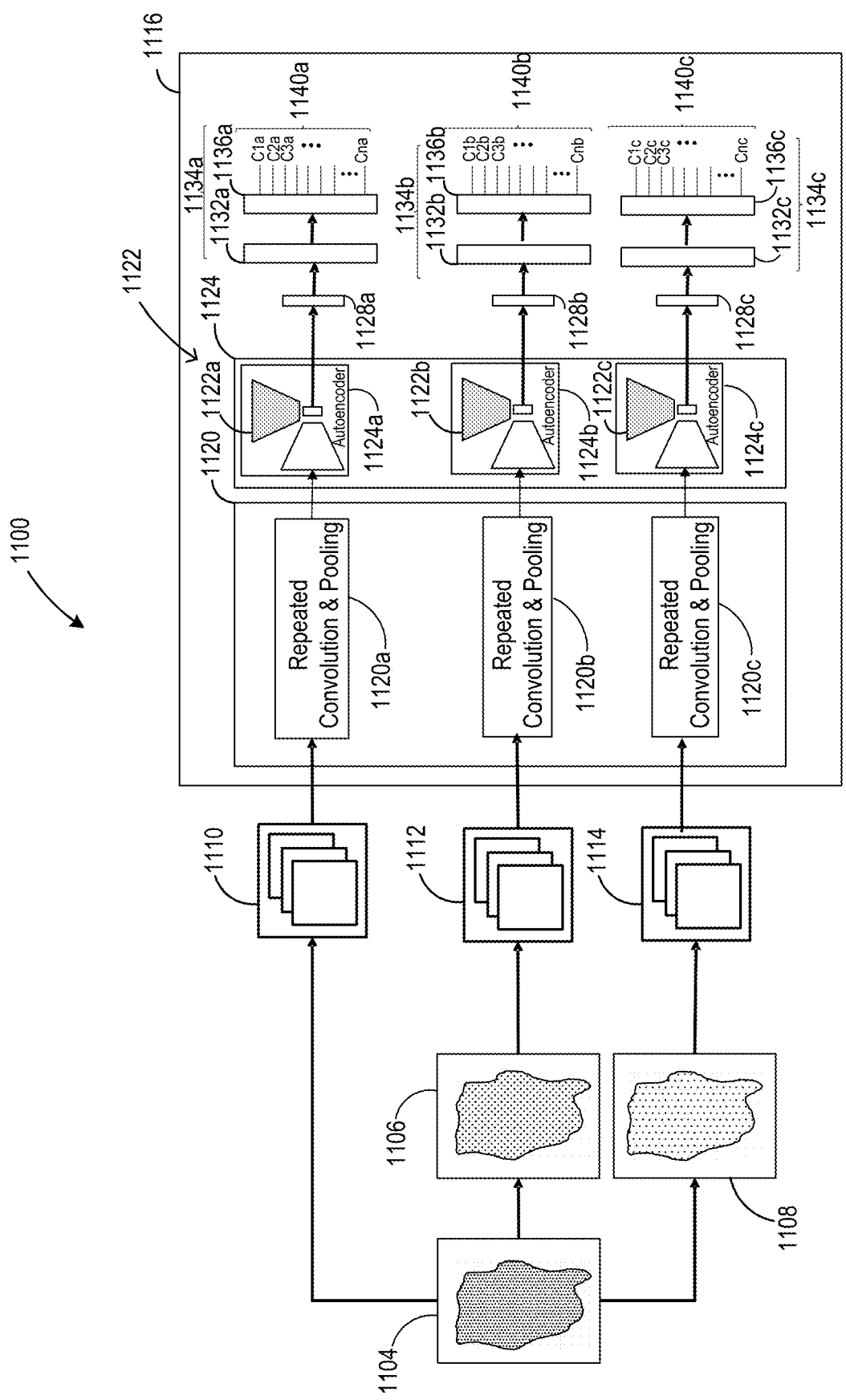
FIG. 11 is a block diagram of a method for generating encoded representations for multiple magnifications of one or more images, in accordance with another example embodiment.

Referring now to FIG. 11, shown therein is another example block diagram 1100 of an ANN that can be used to extract a feature vector representation of image characteristics of a query image at 408. Query image 1104 can be, for example, query image 502, 702, or 904. While query image 1104 is shown in FIG. 11 as being a medical image for illustrative purposes, and in particular, a pathology image, the query image 1104 can be any type of image.

The query image 1104 can be used to generate versions 1106 and 1108 of the query image having lower magnifications. Operations can be applied to the query image 1104 to generate versions 1106 and 1108. For example, operations similar to the sampling operations described in respect of FIG. 8A to 8C can be applied to the query image 1104. That is, versions 1106 and 1108 of the query image 1104 can each have the same area size but correspond to different magnifications and number of pixels.

Query image 1104 corresponds to a first magnification, such as M, and has an area of A. Version 1106 has the same area size as the query image 1104 and corresponds to a second magnification, such as M' (which can be lower than M). Version 1108 has the same area size as the query image 1104 and version 1106 and corresponds to a third magnification, such as M" (which can be lower than each of M and M'). While only two versions 1106 and 1108 of the query image are shown in FIG. 11 for illustrative purposes, fewer or more versions of the query image can be generated.

A plurality of sub-images 1110, 1112, and 1114 can be generated for each of the images 1104, 1106 (i.e., version 1106 of image 1104), and 1108 (i.e., version 1108 of image 1104) independently at 406. That is, preliminary sub-images for each of images 1104, 1106, and 1108 can be independently selected. As described above, selecting preliminary sub-images can involve segmenting the image into sub-images, clustering the sub-images based on similarity, and selecting a mosaic of sub-images as preliminary sub-images to represent the image. A set of anchor points for each image 1104, 1106, and 1108 can be identified from the preliminary sub-images of each image 1104, 1106, and 1108 independently at 404. Each sub-image of the plurality of sub-images 1110, 1112, and 1114 can have n×n pixels.

The sub-images from plurality of sub-images 1110, 1112, and 1114 are input to an ANN. The ANN can be a deep ANN, such as deep ANN 1116. ANN 1116 can be trained to extract a multi-magnification feature vector 1128a, 1128b, 1128c (collectively referred to as 1128) or class 1140a, 1140b, 1140c (collectively referred to as 1140) for each plurality of sub-images, respectively. The ANN 1116 can include a plurality of convolution and pooling blocks 1120a, 1120b, and 1120c (collectively referred to as 1120).

Similar to the convolution and pooling blocks 1020 of FIG. 10, in some embodiments, the number of convolution and pooling blocks 1120 can correspond to the number of different magnifications of the query image. That is, the plurality of sub-images can be grouped by magnification levels. Each group of sub-images having the same magnification level can be input to a convolution and pooling block of the deep ANN 1016. Convolution and pooling operations of different groups of sub-images (i.e., different magnifications) can take place sequentially or in parallel. In the example of FIG. 11, convolution and pooling operations 1120 for different magnifications are shown as being parallel operations at 1120a, 1120b and 1120c to increase speed of the computational process.

Autoencoders 1124a, 1124b, and 1124c (collectively referred to as 1124) can compress the extracted feature vectors of the last pooling layers of 1120a, 1120b and 1120c respectively. Each of the autoencoders 1124a, 1124b, and 1124c can include a respective decoder 1122a, 1122b, and 1122c (collectively referred to as decoders 1122) that can be used during training of the ANN 1116. Autoencoding operations of different groups of sub-images (i.e., different magnifications) can take place sequentially or in parallel. In the example of FIG. 11, autoencoding operations 1124 for different magnifications are shown as being parallel operations 1124a, 1124b, and 1124c to increase speed of the computational process.

While both the convolution and pooling operations 1120 and the autoencoding operations 1124 are shown in FIG. 11 as being parallel operations, in some embodiments, one or both of the convolution and pooling operations 1120 and the autoencoding operations 1124 can be sequential operations.

The feature vectors obtained from the deepest (smallest) layer of the autoencoder 1124a can be concatenated together to provide a single feature vector at 1128a for each sub-image of the plurality of sub-images 1110 for image 1104. The result is a set of feature vectors 1128a—a feature vector for each sub-image of the plurality of sub-images 1110 for image 1104. Each feature vector of the set of feature vectors at 1128a can also be fed into two fully connected layers 1134a consisting of layers 1132a followed by 1136a to classify the plurality of sub-images 1110 into one of n classes C1a, C2a, C3a . . . Cna at 1140a.

Similarly, the feature vectors obtained from the plurality of sub-images 1112 of image 1106 can be concatenated together to provide a single feature vector 1128b for each sub-image of the plurality of sub-images 1112 for image 1106. The result is a set of vectors 1128b—a feature vector for each sub-image of the plurality of sub-images 1112 for image 1106. Each feature vector of the set of feature vectors at 1128b can also be fed into two fully connected layers 1134b consisting of layers 1132b followed by 1136b to classify the plurality of sub-images 1112 into one of n classes C1b, C2b, C3b, . . . Cnb at 1140b.

The feature extraction and classification is repeated for the plurality of sub-images 1114 of image 1108 as well. The feature vectors obtained from the deepest (smallest) layer of the autoencoder 1124c can be concatenated together to provide a single feature vector at 1128c for each sub-image of the plurality of sub-images for image 1108. The result is a set of feature vectors 1128c—a feature vector for each sub-image of the plurality of sub-images 1114 for image 1108. Each feature vector of the set of feature vectors at 1128c can also be fed into two fully connected layers 1134c consisting of layers 1132c followed by 1136c to classify the plurality of sub-images 1114 into one of n classes C1c, C2c, C3c . . . Cnc at 1140c. While two fully connected layers are shown in FIG. 11 for illustrative purposes, one or more fully connected layers can be used.

The concatenated feature vectors at 1128a, 1128b, and 1128c can be used to index the query image 1104. For example, the concatenated feature vectors 1128a, 1128b, 1128c can be concatenated together (similar to 1028 of FIG. 10 above or 1310 of FIG. 13 below) to provide a single feature vector for multiple magnifications (not shown in FIG. 11). That is, a single feature vector can include compressed (autoencoded) features of all magnifications 1124a, 1124b, and 1124c. The single feature vector for multiple magnifications (not shown in FIG. 11) can also be used in one or more fully connected layers to classify the initial image 1104 into one of n classes: C1, C2, C3 . . . , Cn (similar to 1040 of FIG. 10).

The first fully connected layers 1140a, 1140b, and 1140c of each magnification can also be used to index the query image 1104. For example, the classes 1140a, 1140b, and 1140c of the plurality of sub-images for each magnification can be concatenated together to provide a single class for multiple magnifications of the initial image 1104. A class for multiple magnifications of the initial image 1104 can have a higher confidence than that of a class for a single magnification. That is, having the same class or prediction in multiple magnifications can increase the confidence that the image characteristic is present in the image.

Figure 12:
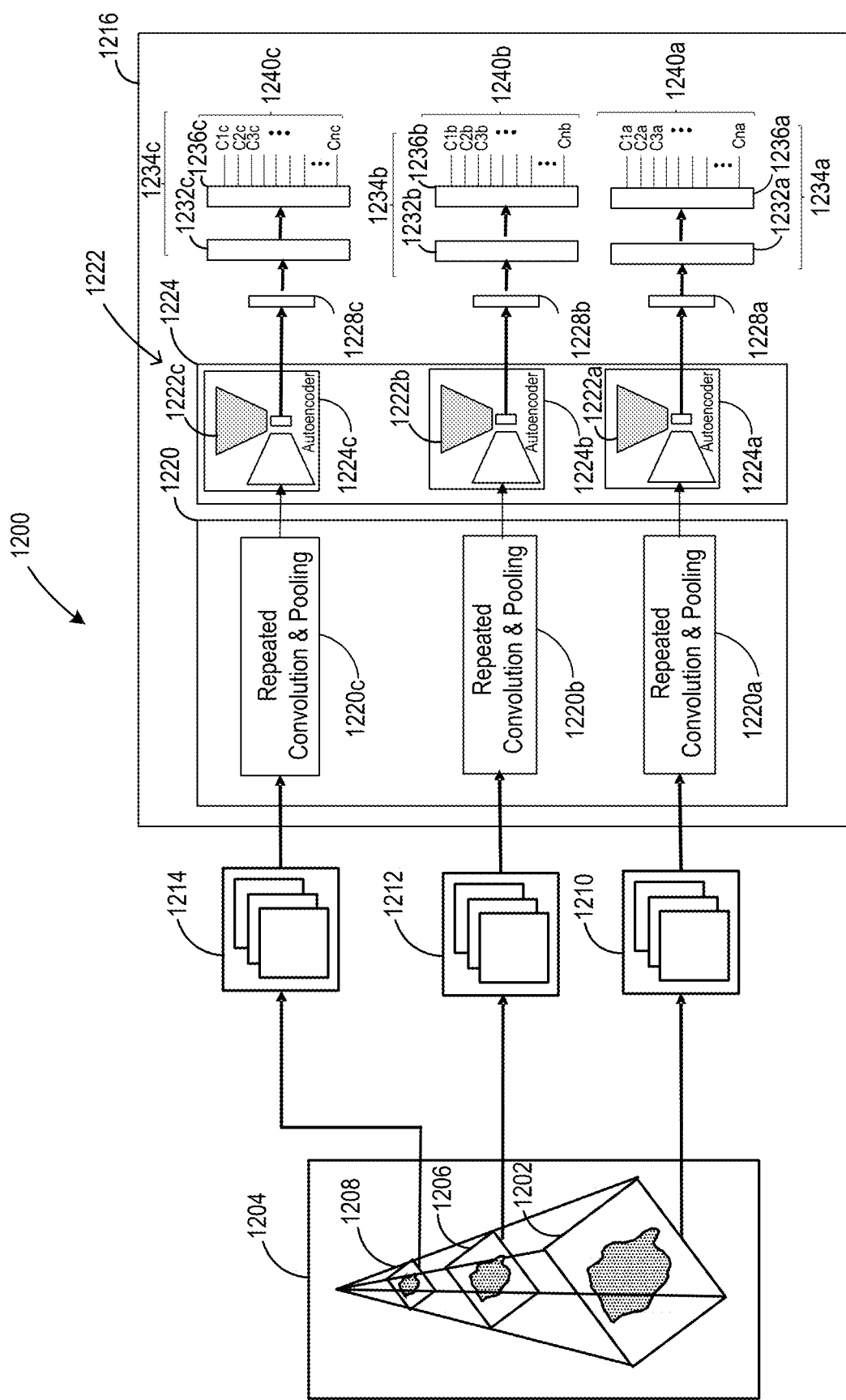
FIG. 12 is a block diagram of a method for generating encoded representations for multiple magnifications of one or more images, in accordance with another example embodiment.

Referring now to FIG. 12, shown therein is another example block diagram 1200 of an ANN that can be used to extract a feature vector representation of image characteristics of a query image at 408. Query image 1204 can be, for example, query image 502, 702, or 904. While query image 1204 is shown in FIG. 12 as being a medical image for illustrative purposes, and in particular, a pathology image, the query image 1204 can be any type of image.

Query image 1204 can be stored in a format that includes additional magnification image layers, such as but not limited to a pyramidal format. In such cases, steps to generate additional magnification images (e.g., sampling operations) are not necessary. Pyramidal formats can typically store the initial image at an original magnification M, a second magnification layer having a magnification of M/2, and a third magnification layer having a magnification of M/4. For example, the pyramidal format of the query image 1204 shown in FIG. 12 includes the initial image 1202 at the original magnification M, a second magnification layer 1206 at a second magnification such as M' (which can be lower than M), and a third magnification layer 1208 at a third magnification such as M'' (which can be lower than M and M'). While only three magnification images 1202, 1206, and 1208 are shown in FIG. 12 for illustrative purposes, the query image can be stored in formats with fewer or more magnification images.

Each of the magnification image layers 1202, 1206, and 1208 can be independently patched, clustered based on similarity as described in FIG. 3 resulting in a plurality of sub-images 1210 for pyramid image layer 1202, a plurality of sub-images 1212 for pyramidal image layer 1206, and a plurality of sub-images 1214 for pyramidal image layer 1208. Each sub-image of the plurality of sub-images 1210, 1212, and 1214 can have n×n pixels.

A plurality of sub-images 1210, 1212, and 1214 can be generated for each of the pyramid image layers 1202, 1206 (i.e., version 1206 of image layer 1202), and 1208 (i.e., version 1208 of image layer 1202) independently at 406. That is, preliminary sub-images for each of image layers 1202, 1206, and 1208 can be independently selected. As described above, selecting preliminary sub-images can involve segmenting the image layer into sub-images, clustering the sub-images based on similarity, and selecting a mosaic of sub-images as preliminary sub-images to represent the image layer. A set of anchor points for each image layer 1202, 1206, and 1208 can be identified from the preliminary sub-images of each image layer 1202, 1206, and 1208 independently at 404. Each sub-image of the plurality of sub-images 1210, 1212, and 1214 can have n×n pixels.

The sub-images from each plurality of sub-images 1210, 1212, and 1214 can be input to an ANN. The ANN can be a deep ANN, such as deep ANN 1216, can be trained to extract a multi-magnification feature vector 1228a, 1228b, 1228c (collectively referred to as 1228) or class 1240a, 1240b, 1240c (collectively referred to as 1240) for each plurality of sub-images 1210, 1212, 1214, respectively. The ANN 1216 can include a plurality of convolution and pooling blocks 1220a, 1220b, and 1220c (collectively referred to as 1220).

Similar to the convolution and pooling blocks 1020 of FIGS. 10 and 1120 of FIG. 11, in some embodiments, the number of convolution and pooling blocks 1220 can correspond to the number of different magnifications layers of the query image 1204. That is, the plurality of sub-images can be grouped by magnification levels. Each group of sub-images having the same magnification level can be input to a convolution and pooling block of the deep ANN 1216. Convolution and pooling operations of different groups of sub-images (i.e., different magnifications) can take place sequentially or in parallel. In the example of FIG. 12, convolution and pooling operations 1220 for different magnifications are shown as being parallel operations at 1220a, 1220b and 1220c to increase speed of the computational process.

Autoencoders 1224a, 1224b, and 1224c (collectively referred to as 1224) can compress the extracted feature vectors of the last pooling layers of 1220a, 1220b and 1220c respectively. Each of the autoencoders 1224a, 1224b, and 1224c can include a respective decoder 1222a, 1222b, and 1222c (collectively referred to as decoders 1222) that can be used during training of the ANN 1216. Autoencoding operations of different groups of sub-images (i.e., different magnifications) can take place sequentially or in parallel. In the example of FIG. 12, autoencoding operations 1224 for different magnifications are shown as being parallel operations 1224a, 1224b, and 1224c to increase speed of the computational process.

While both the convolution and pooling operations 1220 and the autoencoding operations 1224 are shown in FIG. 12 as being parallel operations, in some embodiments, one or both of the convolution and pooling operations 1220 and the autoencoding operations 1224 can be sequential operations.

The feature vectors obtained from the deepest (smallest) layer of the autoencoder 1224a can be concatenated together to provide a single feature vector at 1228a for each sub-image of the plurality of sub-images 1210 for image 1204. The result is a set of feature vectors 1228a—a feature vector for each sub-image of the plurality of sub-images 1210 for image 1204. Each feature vector of the set of feature vectors at 1228a can also be fed into two fully connected layers 1234a consisting of layers 1232a followed by 1236a to classify the plurality of sub-images 1210 into one of n classes C1a, C2a, C3a . . . Cna at 1240a.

Similarly, the feature vectors obtained from the plurality of sub-images 1212 of image 1206 can be concatenated together to provide a single feature vector 1228b for each sub-image of the plurality of sub-images 1212 for image 1206. The result is a set of vectors 1228b—a feature vector for each sub-image of the plurality of sub-images 1212 for image 1206. Each feature vector of the set of feature vectors at 1228b can also be fed into two fully connected layers 1234b consisting of layers 1232b followed by 1236b to classify the plurality of sub-images 1212 into one of n classes C1b, C2b, C3b, . . . Cnb at 1240b.

The feature extraction and classification is repeated for the plurality of sub-images 1214 of image 1208 as well. The feature vectors obtained from the deepest (smallest) layer of the autoencoder 1224c can be concatenated together to provide a single feature vector at 1228c for each sub-image of the plurality of sub-images for image 1208. The result is a set of feature vectors 1228c—a feature vector for each sub-image of the plurality of sub-images 1214 for image 1208. Each feature vector of the set of feature vectors at 1228c can also be fed into two fully connected layers 1234c consisting of layers 1232c followed by 1236c to classify the plurality of sub-images 1214 into one of n classes C1c, C2c, C3c . . . Cnc at 1240c. While two fully connected layers are shown in FIG. 12 for illustrative purposes, one or more fully connected layers can be used.

Either the concatenated feature vectors at 1228a, 1228b, and 1228c or at the first fully connected layer 1240a, 1240b, and 1240c can be used to index the query image 1204 stored in a pyramidal format.

The concatenated feature vectors at 1228a, 1228b, and 1228c can be used to index the query image 1204 stored in a pyramidal format. For example, the concatenated feature vectors 1228a, 1228b, and 1228c can be concatenated together (similar to 1028 of FIG. 10 above or 1310 of FIG. 13 below) to provide a single feature vector for multiple magnifications (not shown in FIG. 12). That is, a single feature vector can include compressed (autoencoded) features of all magnifications 1224a, 1224b, and 1224c. The single feature vector for multiple magnifications (not shown in FIG. 12) can also be used in one or more fully connected layers to classify the initial image 1204 into one of n classes: C1, C2, C3 . . . , Cn (similar to 1040 of FIG. 10).

The first fully connected layers 1240a, 1240b, and 1240c of each magnification can also be used to index the query image 1204. For example, the classes 1240a, 1240b, and 1240c of the plurality of sub-images for each magnification can be concatenated together to provide a single class for multiple magnifications of the initial image 1204. A class for multiple magnifications of the initial image 1204 can have a higher confidence than that of a class for a single magnification. That is, having the same class or prediction in multiple magnifications can increase the confidence that the image characteristic is present in the image.

Figure 13:
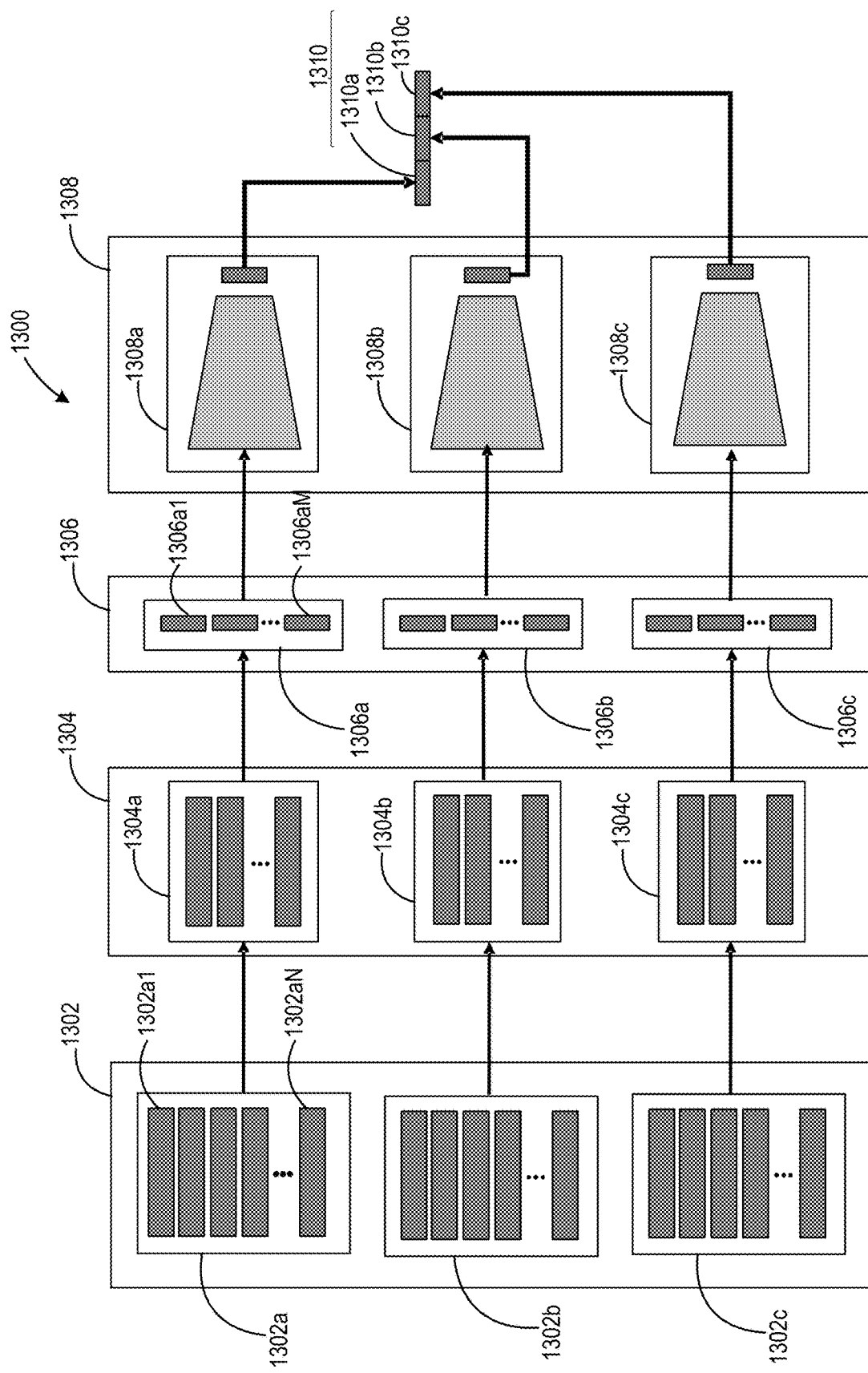
FIG. 13 is a block diagram of a method for generating an encoded representation based on feature vectors extracted for a plurality of magnification levels.

Reference now is made to FIG. 13, which shows an example block diagram 1300 for generating an encoded representation based on feature vectors extracted for a plurality of magnification levels. The generation of an encoded representation based on feature vectors extracted for a plurality of magnification levels can be, for example, used at 410 of method 400 in FIG. 4.

In some embodiments, an initial feature vector 1302 can include a plurality of initial feature vectors 1302a, 1302b, and 1302c that each represent images or sub-images having different magnifications M, M', and M" respectively. For example, sub-images having magnifications M, M', and M" can be sub-images of the plurality of sub-images 1012a, 1012b, and 1012c in FIG. 10, respectively. In additional examples, sub-images having magnifications M, M', and M" can be sub-images of the plurality of sub-images 1110, 1112, and 1114 of FIG. 11 respectively or the plurality of sub-images 1210, 1212, and 1214 or FIG. 12 respectively. Initial feature vectors 1302a can be extracted from a sub-image having magnification M, initial feature vectors 1302b can be extracted from a sub-image having magnification M' that is lower than M, and initial feature vectors 1302c can be extracted from a sub-image having magnification M" that is lower than M and M'. For example, initial feature vectors 1302a, 1302b, and 1302c can be feature vectors 1128a, 1128b, and 1128c of FIG. 11 respectively or feature vectors 1228a, 1228b, and 1128c of FIG. 12 respectively.

The number of initial feature vectors 1302a, 1302b, and 1302c for each magnification can be reduced. In some embodiments, a feature aggregator, such as feature aggregator 1304 of FIG. 13, can reduce the number of initial feature vectors for each magnification to provide a plurality of intermediate feature vectors 1306a, 1306b, and 1306c (collectively referred to as intermediate feature vector 1306). For example, initial feature vector 1302a can include N feature vectors, such as 1302a1 to 1302aN, and an intermediate feature vector 1306a can include M feature vectors, such as 1306a1 to 1306aM, in which M is fewer than N.

In some embodiments, the feature aggregator 1304 can include separate engine blocks 1304a, 1304b, and 1304c for each magnification. The feature aggregator 1304 can reduce the number of feature vectors by aggregating similar features. In some embodiments, aggregation can involve determining median feature vectors. The median feature vectors of the group of similar feature vectors can be used to represent the group of similar feature vectors while the other feature vectors of the group of similar feature vectors can be discarded.

In some embodiments, determining a median feature vector can involve sorting a group of similar feature vectors f1, f2, . . . , fn to determine a feature position for each feature vector within the group of similar feature vectors. For each feature position, a median feature value can be determined. Together, the median feature value at each feature position can form the median feature vector. For example if each feature vector of a group of similar feature vectors has 1024 feature positions, the median feature value at each feature position is calculated, creating a new 1024 feature position vector that can be the median feature vector for the group of similar feature vectors.

In some embodiments, aggregation can involve clustering techniques. For example, the N feature vectors can be clustered into a plurality of clusters. A subset of feature vectors from each cluster can be selected to represent that cluster. Each feature vector of the plurality of subsets can be used as an intermediate feature vector for the magnification. That is, the subset of feature vectors can be M, which is fewer than the N feature vectors that were clustered.

For example, to select a subset of feature vectors for a cluster, a center of the cluster can be determined, and a distance between each feature vector of the cluster and the center of the cluster can be calculated. The occurrences of the distance between each feature vector and the center of the cluster can be tabulated to generate a histogram for the cluster. The histogram distribution can be used to select the subset of feature vectors of the cluster.

In some embodiments, the number of intermediate feature vectors 1306 can be further reduced. In some embodiments, a feature selector, such as feature selector 1308 of FIG. 13, can reduce the number of intermediate feature vectors for each magnification to provide a reduced feature vector 1310a, 1310b, 1310c (collectively referred to as reduced feature vector 1310). In particular, feature selection can be used to combine all feature vectors of the intermediate feature vectors into a reduced feature vector. Various techniques for feature selection can be used, including but not limited to principal component analysis (PCA), autoencoders (Aes), and evolutionary optimization. For example, intermediate feature vector 1306a can include M feature vectors, such as 1306a1 to 1306aM, and a reduced feature vector 1310a is a single feature vector.

It should be noted that in some embodiments, a single feature vector can be obtained from the initial feature vector directly. That is, the initial feature vector 1302 can be fused by the feature selector 1304 and the feature aggregator 1304 can be omitted.

The reduced feature vectors 1310 for each magnification, such as 1310a, 1310b, and 1310c can be concatenated together into a single feature vector 1310 to provide an image index representing multiple magnifications of the entire image. In some embodiments, the concatenated feature vector can be converted to a barcode.

At lower magnification levels, sub-images within an image can overlap. If the number of anchors is reduced, a fewer number of sub-images from which to generate feature vectors would be available. Instead, image identifiers generated from sub-images for a plurality of magnification levels can provide more information—both finer details and larger structure information at the same time—than image identifiers generated from sub-images of a single magnification level. Furthermore, it can be advantageous for an image identifier to include information captured at multiple magnifications as this can allow for the search of digital archives for similar image data at multiple magnifications.

In medical imaging, and in particular in digital pathology, horizontal searching relates to finding similar images within all organ types while vertical searching relates to finding similar images within the same organ type. Both horizontal and vertical searching using image identifiers based on multiple magnifications can be more accurate because the similarity matching will be performed at multiple magnifications.

Furthermore, a user can have more control over search parameters with image identifiers based on multiple magnifications. For example, the significance of an individual magnification level can be set with respect to a specific disease. That is, searching can be targeted within a specific magnification only (i.e., "single-magnification search") or across multiple magnifications (i.e., "multi-magnification search" or "pan-magnification match").

Furthermore, multi-magnification and single-magnification searches can also be combined. In some cases, the results of such a combined search can be more efficient and accurate. To combine the multi-magnification and single-magnification searches, the searches can be performed in sequence. That is, a single-magnification search can be followed by a multi-magnification search to enable a user to search from larger structural information to finer detailed information. More specifically, the results of a single-magnification search can be further searched with multi-magnification. That is, a single-magnification search can first be performed to locate an initial set of similar images from a database or archive. Subsequently, a multi-magnification search can be performed to locate similar images from the results of the single-magnification search (i.e., the initial set of similar images). For example, in digital pathology, it can be advantageous to first conduct a search for tissue structure similarities followed by finer details of the tissue structure. Such sequential searching can enhance diagnostic accuracy and also simulate the traditional pathology. That is, sequential searching can simulate analysis using an analog microscope, as tissue slides at different magnifications are viewed manually by moving different objectives in the optical path of the analog microscope.

In addition, the multi-magnification search can be used to improve the accuracy of single-magnification search, and vice versa. For example, the multi-magnification search and the single-magnification search can be performed in parallel and the results of both searches can be compared with one another to identify common, or overlapping, results. Common or overlapping results can be identified as more accurate results.

Figure 14:
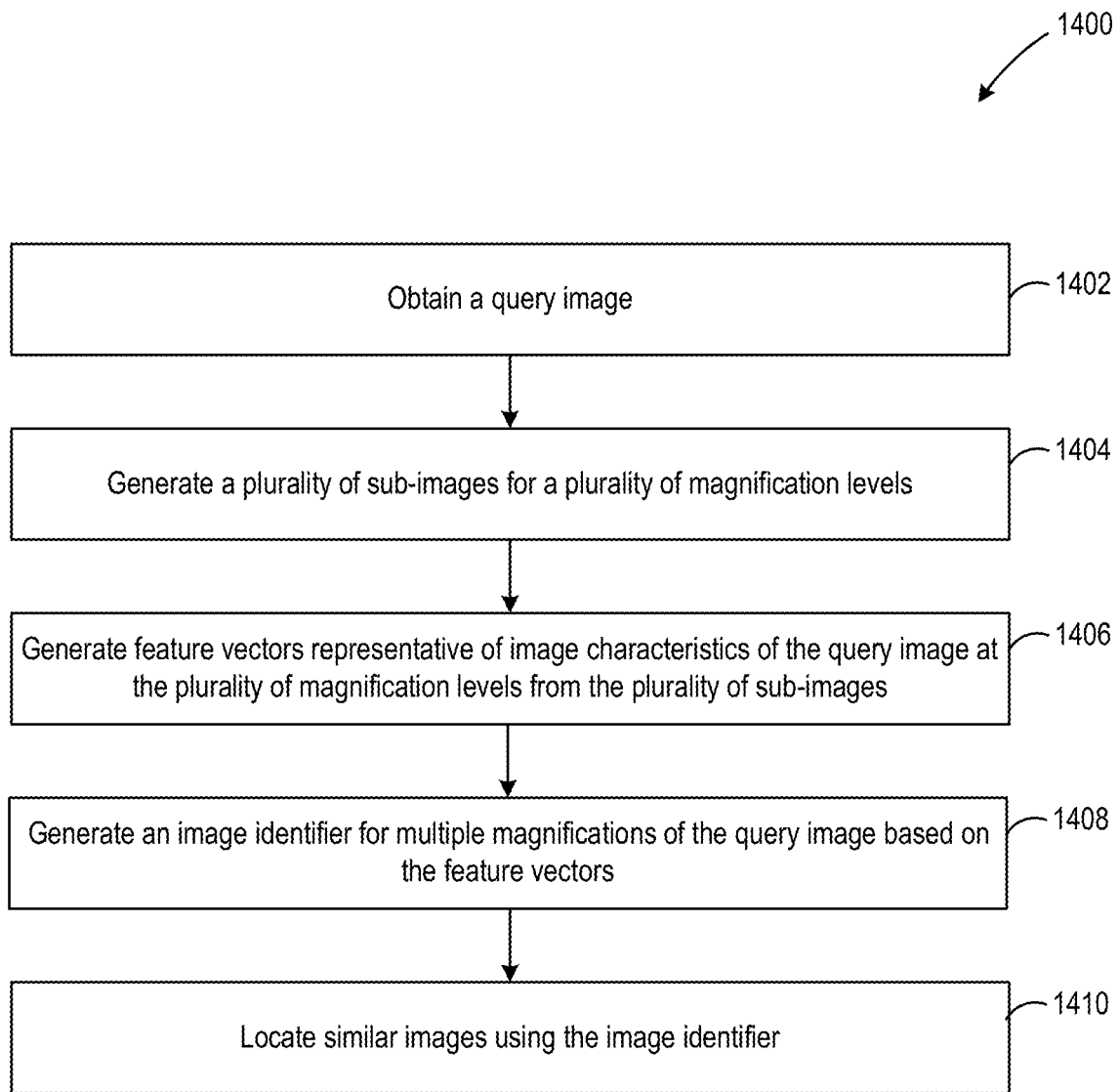
FIG. 14 is a flowchart of an example method of locating images with similar image data as a query image, in accordance with an example embodiment.

Referring now to FIG. 14, an example method 1400 of locating images with similar image data as a query image is shown in a flowchart diagram. An image management system, such as image management system 110 having a processor 112 can be configured to implement method 1400. Method 1400 can be reiterated for each query image of the one or more query images.

Method 1400 can begin at 1402, when the processor 112 obtains a query image, such as example query image 502, 702, 904, 1004, 1104, or 1204. Although query images 502,

702, 904, 1004, 1104, or 1204 as shown in FIGS. 5A, 7, 9, and 10 to 12 as being medical images, and in particular, histopathology images, the query image can be any type of image. For example, the query image can be a satellite image.

Furthermore, the processor 112 can obtain one or more query images. The one or more query images can be obtained from an imaging device 120, a computing device 150, or a system storage component 140. The term "query image" used herein refers to an image for the purpose of using as an input to operation performed by a processor, such as processor 112.

At 1404, the processor 112 can generate a plurality of sub-images within the query image for a plurality of magnification levels, similar to 406 of method 400 in FIG. 4. In some embodiments, the processor 112 can include a dedicated component, such as a patching component, for performing 1404.

At 1406, the processor 112 can generate feature vectors representative of image characteristics of the query image at the plurality of magnification levels from the plurality of sub-images. In some embodiments, the processor 112 can also generate classes representative of image characteristics of the query image at the plurality of magnification levels from the plurality of sub-images. In some embodiments, the processor 112 can include an ANN for performing 1406. In some embodiments, 1406 can be similar to 408 of method 400 in FIG. 4.

At 1408, the processor 112 can generate an encoded representation for multiple magnifications of the query image based on the feature vectors, similar to 410 of method 400 in FIG. 4. In some embodiments, the processor 112 can generate an encoded representation for multiple magnifications of the query image based on the classes. In some embodiments, the processor 112 can include a dedicated component, such as an indexing component, for performing 1408. The encoded representation for multiple magnifications of the query image can be used as an image identifier for the query image.

At 1410, the processor 112 can locate similar images to the query image using the encoded representation for multiple magnifications of the query image. In some embodiments, the processor 112 can include a dedicated component, such as a searching component, for performing 1408. In some embodiments, similar images can be located based on image identifiers for images stored in a database, archive, or repository provided by the storage component 114 or the system storage component 140.

The search results, that is, the similar images located at 1410 can be displayed at a computing device 150 for review. In some embodiments, the search results can also include reports and metadata associated with the images. For example, in the pathology context, reports and metadata can provide information helpful for diagnosis.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims. Also, in the various user interfaces illustrated in the drawings, it will be understood that the illustrated user interface text and controls are provided as examples only and are not meant to be limiting. Other suitable user interface elements may be possible.

We claim:

1. A computer-implemented method of generating encoded representations for multiple magnifications of one or more query images, the method comprising operating a processor to, for each query image;
   obtain the query image having an initial magnification level;
   sample the query image to obtain one or more versions of the query image, each version of the query image having a magnification level of the plurality of magnification levels;
   identify a set of anchor points within each version of the query image;
   generating a plurality of sub-images for a plurality of magnification levels for each anchor point of the set of anchor points from each version of the query image, each sub-image comprising the anchor point and corresponding to a magnification level of the plurality of magnification levels;
   apply an artificial neural network model to a group of sub-images for each magnification level of the plurality of magnification levels to extract a feature vector representation of image characteristics of the query image at that magnification level; and
   generate an encoded representation for multiple magnifications of the query image based on the feature vectors extracted for the plurality of magnification levels.

2. A computer-implemented method of generating encoded representations for multiple magnifications of one or more query images, the method comprising operating a processor to, for each query image,
   obtain the query image having an initial magnification level;
   identify a set of anchor points within the query image;
   generate a plurality of sub-images for a plurality of magnification levels for each anchor point of the set of anchor points, each sub-image comprising the anchor point and corresponding to a magnification level of the plurality of magnification levels, wherein generating the plurality of sub-images comprises;
      generating a plurality of initial sub-images from the query image, each initial sub-image of the plurality of initial sub-images having the initial magnification level; and
      sampling each initial sub-image to obtain a version of the initial sub-image, each version of the sub-image having a magnification level of the plurality of magnification levels;
   apply an artificial neural network model to a group of sub-images for each magnification level of the plurality of magnification levels to extract a feature vector representation of image characteristics of the query image at the magnification level; and
   generate an encoded representation for multiple magnifications of the query image based on the feature vectors extracted for the plurality of magnification levels.

3. A computer-implemented method of generating encoded representations for multiple magnifications of one or more query images, the method comprising operating a processor to, for each query image,
   obtain the query image having an initial magnification level;
   identify a set of anchor points within the query image;
   generating a plurality of sub-images for a plurality of magnification levels for each anchor point of the set of anchor points, each sub-image comprising the anchor point and corresponding to a magnification level of the plurality of magnification levels;
   apply an artificial neural network model to a group of sub-images for each magnification level of the plurality of magnification levels to extract a feature vector representative of image characteristics of the query image at that magnification level, wherein applying the artificial neural network model comprises:
      repeatedly pooling and convoluting the group of sub-images to extract and aggregate feature vectors for that magnification level; and
      compressing the feature vectors for that magnification level to obtain a feature vector for that magnification level; and
   generate an encoded representation for multiple magnifications of the query image based on the feature vectors extracted for the plurality of magnification levels.

4. A computer-implemented method of generating encoded representations for multiple magnifications of one or more query images, the method comprising operating a processor to, for each query image,
   obtain the query image having an initial magnification level;
   identify a set of anchor points within the query image;
   generate a plurality of sub-images for a plurality of magnification levels for each anchor point of the set anchor points, each sub-image comprising the anchor point and corresponding to a magnification level of the plurality of magnification levels;
   apply an artificial neural network model to a group of sub-images for each magnification level of the plurality of magnification levels to extract a feature vector representative of image characteristics of the query image at the magnification level; and
   generate an encoded representation for multiple magnifications of the query image based on the feature vectors extracted for the plurality of magnification levels, wherein generating the encoded representation comprises, for each magnification level of the plurality of magnification levels, reducing a number of feature vectors for that magnification level.

5. A system for generating encoded representations for multiple magnifications of one or more query images, the system comprising:
   a communication component to provide access to the one or more images via a network; and
   a processor in communication with the communication component, the processor being operable to, for each query image:
      obtain the query image having an initial magnification level;
      identify a set of anchor points within the query image;

sample the query image to obtain one or more versions of the query image, each version of the query image having a magnification level of the plurality of magnification levels;

generate a plurality of sub-images for a plurality of magnification levels for each anchor point of the set of anchor points from each version of the query image, each sub-image comprising the anchor point and corresponding to a magnification level of the plurality of magnification levels;

apply an artificial neural network model to a group of sub-images for each magnification level of the plurality of magnification levels to extract a feature vector representative of image characteristics of the query image at that magnification level; and generate an encoded representation for multiple magnifications of the query image based on the feature vectors extracted for the plurality of magnification levels.

6. The method of claim 1, wherein each sub-image of the plurality of sub-images for the plurality of magnification levels consists of an equal number of pixels as other sub-images of the plurality of sub-images.

7. The method of claim 1, wherein each sub-image of the plurality of sub-images for the plurality of magnification levels comprises same dimensions as other sub-images of the plurality of sub-images, the dimensions being characterized by pixels.

8. The method of claim 1, wherein each sub-image of the plurality of sub-images for an anchor point corresponds to a portion of the query image having a different area size than another sub-image for the anchor point.

9. The method of claim 1, wherein at least a portion of each sub-image of the plurality of sub-images for an anchor point corresponds to the same portion of the query image as the other sub-images of the plurality of sub-images for that anchor point.

10. The method of claim 1 comprises sampling at least a portion of the query image to obtain one or more versions of at least the portion of the query image having a magnification level less than the initial magnification level.

11. The method of claim 10, wherein sampling at least the portion of the query image comprises:
dividing the portion of the query image into subsets of pixels; and
for each subset of pixels, generating one or more representative pixels for representing the subset of pixels, the representative pixels being fewer than the subset of pixels.

12. The method claim 11, wherein for each subset of pixels, the one or more representative pixels comprise one representative pixel.

13. The method claim 12, wherein for each subset of pixels, an intensity level of the representative pixel comprises an average of intensity levels of the pixels of the subset of pixels.

14. The method claim 13, wherein the average of the intensity levels of the pixels of the subset of pixels comprises the mean of the intensity levels of pixels of the subset of pixels.

15. The method of claim 2, wherein each initial sub-image of the plurality of initial sub-images consists of a different number of pixels than another sub-image for the anchor point.

16. The method of claim 2, wherein each initial sub-image of the plurality of initial sub-images comprises different dimensions than another sub-image for the anchor point, the dimensions being characterized by pixels.

17. The method of claim 2, wherein each initial sub-image of the plurality of initial sub-images for an anchor point corresponds to a portion of the query image having a different area size than another initial sub-image for the anchor point.

18. The method of claim 1, wherein generating the plurality of sub-images for the plurality of magnification levels comprises generating a plurality of concentric sub-images for the plurality of magnification.

19. The method of claim 1, wherein generating the plurality of sub-images for the plurality of magnification levels comprises using the anchor point as a center point of each sub-image of the plurality of sub-images for the plurality of magnification levels.

20. The method of claim 3, wherein sub-images having different magnification levels are repeatedly pooled and convoluted in parallel.

21. The method of claim 3, wherein sub-images having different magnification levels are repeatedly pooled and convoluted in sequence.

22. The method of claim 1, wherein generating the encoded representation for multiple magnifications based on the feature vectors extracted for the plurality of magnification levels comprises concatenating the feature vectors extracted for each magnification level together.

23. The method of claim 1, wherein applying the artificial neural network model to the group of sub-images for each magnification level of the plurality of magnification levels to extract a feature vector representative of image characteristics of the query image at that magnification level further comprises:
classifying the feature vector for that magnification level to obtain a classification of image characteristics of the query image at that magnification level.

24. The method of claim 23, wherein classifying the feature vector for that magnification level comprises applying one or more fully connected neural network layers to the feature vector obtained for that magnification level.

25. The method of claim 4, wherein reducing the number of feature vectors for that magnification level comprises identifying a median feature vector to represent a plurality of feature vectors.

26. The method of claim 4, wherein reducing the number of feature vectors for that magnification level comprises clustering a plurality of feature vectors into a plurality of clusters and selecting a subset of feature vectors from each cluster of the plurality of clusters to represent the plurality of feature vectors.

27. The method of claim 4, wherein reducing the number of feature vectors for that magnification level comprises combining feature vectors for a magnification level to obtain a feature vector for a magnification.

28. The method of claim 27, wherein combining feature vectors for a magnification level comprises using at least one of principal component analysis, autoencoding, or evolutionary optimization.

29. The method of claim 1, wherein identifying the set of anchor points within the query image comprises:
generating a set of preliminary sub-images; and
for each preliminary sub-image of the set of preliminary sub-images, identifying an anchor point from the preliminary sub-image to provide the set of anchor points, a relationship between each anchor point and a respective sub-image being same.

30. The method of claim 1, wherein the plurality of magnification levels comprise an initial magnification level, a second magnification level that is a half of the initial magnification level, and a third magnification level that is a quarter of the initial magnification level.

31. The method of claim 1 comprising operating the processor to obtain the one or more query images from an imaging device.

32. The method of claim 2, wherein generating the encoded representation for multiple magnifications based on the feature vectors extracted for the plurality of magnification levels comprises concatenating the feature vectors extracted for each magnification level together.

33. The method of claim 2, wherein applying the artificial neural network model to the group of sub-images for each magnification level of the plurality of magnification levels to extract the feature vector representative of image characteristics of the query image at that magnification level further comprises:
classifying the feature vector for that magnification level to obtain a classification of image characteristics of the query image at that magnification level.

34. The method of claim 2, wherein identifying the set of anchor points within the query image comprises:
generating a set of preliminary sub-images; and
for each preliminary sub-image of the set of preliminary sub-images, identifying an anchor point from the preliminary sub-image to provide the set of anchor points, a relationship between each anchor point and a respective sub-image being same.

35. The method of claim 3, wherein generating the encoded representation for multiple magnifications based on the feature vectors extracted for the plurality of magnification levels comprises concatenating the feature vectors extracted for each magnification level together.

36. The method of claim 3, wherein identifying the set of anchor points within the query image comprises:
generating a set of preliminary sub-images; and
for each preliminary sub-image of the set of preliminary sub-images, identifying an anchor point from the preliminary sub-image to provide the set of anchor points, a relationship between each anchor point and a respective sub-image being same.

37. The method of claim 4, wherein generating the encoded representation for multiple magnifications based on the feature vectors further comprises concatenating the feature vectors extracted for each magnification level together.

38. The method of claim 4, wherein identifying the set of anchor points within the query image comprises:
generating a set of preliminary sub-images; and
for each preliminary sub-image of the set of preliminary sub-images, identifying an anchor point from the preliminary sub-image to provide the set of anchor points, a relationship between each anchor point and a respective sub-image being same.

* * * * *

UNITED STATES PATENT AND TRADEMARK OFFICE
CERTIFICATE OF CORRECTION

PATENT NO. : 11,610,395 B2
APPLICATION NO. : 17/534693
DATED : March 21, 2023
INVENTOR(S) : Hamid Reza Tizhoosh, Savvas Damaskinos and Arthur Edward Dixon It is certified that error appears in the above-identified patent and that said Letters Patent is hereby corrected as shown below:

On the Title Page

Item (71) Applicant:
"Huron Techonologies International Inc., St. Jacobs (CA)" should recite -- Huron Technologies International Inc., St. Jacobs (CA) --

In the Specification

Column 23, Line 6:
"Ake" should recite -- $Ak^2$ --

In the Claims

Claim 1, Column 35, Line 30:
"generating" should recite -- generate --

Claim 1, Column 35, Line 39:
"representation" should recite -- representative --

Claim 2, Column 35, Line 56:
"comprises;" should recite -- comprises: --

Claim 2, Column 36, Line 1:
"representation" should recite -- representative --

Claim 3, Column 36, Line 13:
"generating" should recite -- generate --

Claim 4, Column 36, Line 49:
"the magnification level" should recite -- that magnification level --

Signed and Sealed this
First Day of October, 2024

Katherine Kelly Vidal
*Director of the United States Patent and Trademark Office*